US011945952B2

(12) United States Patent
Cataldo et al.

(10) Patent No.: US 11,945,952 B2
(45) Date of Patent: Apr. 2, 2024

(54) RUBBER COMPOSITION COMPRISING ESTERS FROM RENEWABLE SOURCES AS PLASTICIZERS

(71) Applicant: TOTAL MARKETING SERVICES, Puteaux (FR)

(72) Inventors: Franco Cataldo, Rome (IT); Louis Plancq, Levallois-Perret (FR); Francine Genin, Houilles (FR); Zubin Arora, Paris (FR)

(73) Assignee: TOTAL MARKETING SERVICES, Puteaux (FR)

( * ) Notice: Subject to any disclaimer, the term of this patent is extended or adjusted under 35 U.S.C. 154(b) by 306 days.

(21) Appl. No.: 17/414,120

(22) PCT Filed: Dec. 20, 2019

(86) PCT No.: PCT/EP2019/086741
§ 371 (c)(1),
(2) Date: Jun. 15, 2021

(87) PCT Pub. No.: WO2020/128007
PCT Pub. Date: Jun. 25, 2020

(65) Prior Publication Data
US 2022/0033624 A1 Feb. 3, 2022

(30) Foreign Application Priority Data
Dec. 20, 2018 (EP) ..................................... 18306771

(51) Int. Cl.
| | | |
|---|---|---|
| *C08L 19/00* | (2006.01) | |
| *B60C 1/00* | (2006.01) | |
| *C08F 136/08* | (2006.01) | |
| *C08K 3/04* | (2006.01) | |
| *C08K 3/36* | (2006.01) | |
| *C08K 5/05* | (2006.01) | |
| *C08K 5/092* | (2006.01) | |
| *C08K 5/11* | (2006.01) | |
| *C08K 5/12* | (2006.01) | |
| *C08L 7/00* | (2006.01) | |
| *C08L 9/06* | (2006.01) | |

(52) U.S. Cl.
CPC .............. *C08L 9/06* (2013.01); *B60C 1/0016* (2013.01); *C08F 136/08* (2013.01); *C08K 3/04* (2013.01); *C08K 3/36* (2013.01); *C08K 5/05* (2013.01); *C08K 5/092* (2013.01); *C08K 5/11* (2013.01); *C08K 5/12* (2013.01); *C08L 7/00* (2013.01); *C08L 2205/025* (2013.01)

(58) Field of Classification Search
CPC ............. C08L 19/00; C08L 7/00; C08K 3/04; C08K 3/36; C08K 5/05; C08K 5/12; B60C 1/00
USPC ......................................................... 523/156
See application file for complete search history.

(56) References Cited

U.S. PATENT DOCUMENTS

| | | |
|---|---|---|
| 2,673,184 A | 3/1954 | Morway et al. |
| 2,849,399 A | 8/1958 | Matuszak et al. |
| 3,555,057 A | 1/1971 | Knight et al. |
| 4,052,425 A | 10/1977 | Leonard et al. |
| 7,109,264 B2 | 9/2006 | O'Rourke et al. |
| 8,637,597 B2 | 1/2014 | Lopitaux |
| 8,969,454 B2 | 3/2015 | Bastioli et al. |
| 9,505,897 B2 | 11/2016 | Shimanaka et al. |
| 2003/0220426 A1 | 11/2003 | Wentworth et al. |
| 2004/0072934 A1 | 4/2004 | O'Rourke et al. |
| 2004/0127617 A1 | 7/2004 | Vasseur et al. |
| 2007/0077443 A1 | 4/2007 | O'Rourke et al. |
| 2011/0195148 A1 | 8/2011 | Mentink |
| 2013/0267640 A1 | 10/2013 | Lopez et al. |
| 2013/0289182 A1 | 10/2013 | Bastioli |
| 2014/0024745 A1 | 1/2014 | Vasseur et al. |
| 2015/0126698 A1 | 5/2015 | Kojima |
| 2016/0272795 A1 | 9/2016 | Soucek et al. |
| 2016/0355665 A1 | 12/2016 | Daute |
| 2017/0349733 A1 | 12/2017 | Isitman et al. |
| 2018/0148567 A1 | 5/2018 | Papakonstantopoulos et al. |

FOREIGN PATENT DOCUMENTS

| | | | |
|---|---|---|---|
| CA | 1252592 | 4/1989 | |
| EP | 1270657 | 6/2001 | |
| RU | 2508302 | 9/2012 | |
| RU | 2644167 | 11/2017 | |
| WO | WO-2009093695 A1 * | 7/2009 | .............. C08L 21/00 |
| WO | WO-2010047315 A1 * | 4/2010 | .............. C08G 69/40 |
| WO | 2016069673 | 5/2016 | |

* cited by examiner

*Primary Examiner* — Deve V Hall
(74) *Attorney, Agent, or Firm* — DUANE MORRIS, LLP; Gregory M. Lefkowitz; Brandon A. Chan

(57) ABSTRACT

The present invention relates to a rubber composition for tire applications comprising: rubber polymer(s) comprising at least optionally-functionalized styrene-butadiene rubber (SBR) and at least one rubber selected from polybutadiene rubber (BR), natural rubber (NR), polyisoprene rubber (IR) and mixtures thereof, and at least one ester derived from renewable sources resulting from the esterification of trimer and/or dimer acids having the formula A-(COOH)q, with q being 2 or 3 and A being an acyclic, cyclic or polycyclic, saturated or unsaturated, linear or branched hydrocarbon group having from 3 to 69 carbon atoms, with acyclic or cyclic, saturated or unsaturated, linear or branched alcohols.

19 Claims, 6 Drawing Sheets

$R_1 = -(CH_2)_8COOH$
$R_2 = -(CH_2)_4CH_3$
$R_3 = -CH=CH-(CH_2)_8-COOH$
$R_4 = -CH=CH-(CH_2)_4-CH_3$ $R_2 = -(CH_2)_4-CH3$
$R_5 = -(CH_2)_7-COOH$

RUBBER COMPOSITION COMPRISING ESTERS FROM RENEWABLE SOURCES AS PLASTICIZERS

CROSS-REFERENCE TO RELATED APPLICATIONS

This application is a § 371 national stage entry of International Application No. PCT/EP2019/086741, filed Dec. 20, 2019, which claims priority to European Patent Application No. 18306771.9, filed Dec. 20, 2018, the entire contents of which are incorporated herein by reference.

TECHNICAL FIELD

The present invention relates to new plasticizers produced from raw materials from renewable sources and applied in formulations of cross-linkable or cross-linked rubber compositions usable in tires, and applied to tires treads in particular.

BACKGROUND ART

Petroleum-based plasticizers are currently used in rubber compounding for tire applications. The most commonly known plasticizers or oil extenders are the residual aromatic extract (RAE), treated distillate aromatic extract (T-DAE), the mild or medium extract solvate (MES) and the naphthenic oils. Furthermore, in certain tread formulation also ester-type plasticizers such as dioctylphthalate (DOP) or dioctyladipate (DOA), to cite just a couple, or also polyalkylene adipates and succinates or glycerol triesters of fatty acids were or are used in rubber compounding. Examples of these applications can be found for example in documents EP 2655503 B1, U.S. Pat. No. 9,505,897 B2, WO 02/088238 A1, US 2013/0267640 A1 and EP 3251872 A1.

Neither the petroleum-based plasticizer nor the phthalates and adipates are derived from renewable sources. Furthermore, the currently used petroleum-based plasticizers must comply with the requirements of the entry 50 section 1 of the Annex XVII of REACh related to restrictions on the use of PAH in the production of tires or parts of tires. PAH being well known to be hazardous for human heath and environment, less than 1 ppm of benzo(a)-pyrene and less than 10 ppm of the sum of the eight Polycyclic Aromatic Hydrocarbons listed are restricted in tires/extenders oils.

Similarly, also phthalates have received special attention in recent years due to health assessment studies indicating potential risks for humans. In the U.S. Pat. No. 8,637,597 B2 the phthalate esters are substituted by 1,2-cyclohexandicarboxylate esters in tire application to get rid of phthalates. There is instead a growing interest toward the introduction and use of new plasticizers for rubber compositions for tire applications in general and tire tread applications in particular produced from raw materials derived from completely renewable sources and characterized by the absence of any health and environmental concern in contrast with the petroleum-based plasticizers.

The patent literature is rich of applications suggesting a growing interest in the research of new plasticizers from renewable sources as partial or total replacement of petroleum-based plasticizers. Besides, some open literature publications studied the behavior of rubber compositions comprising vegetable oils as plasticizers, such as soybean oil [Gujel, A. A., et al. (2014) *Materials & Design,* 53, 1112-1118], or cashew nut oil [Moresco, S., et al. (2018) *Journal of Cleaner Production,* 117, 199-206]. In practice, vegetable oils are mainly reported as partial replacement. This can be found, for example, in U.S. Pat. No. 7,335,692 B2, where highly oleic sunflower oil, glycerol trioleate and other triglycerides are disclosed in combination with a high viscosity aromatic oil from petroleum origin as suitable plasticizer of a tread composition. Similarly, EP 1270657 B1 discloses rubber compositions comprising rapeseed oil in combination with MES or with an aromatic oil from petroleum origin.

Other open literature publications studied the behavior of rubber compositions comprising modified vegetable oils such as for example methyl esters of fatty acids [Cataldo, F., et al. (2013) *ISRN Polymer Science,* Article ID 340428, 9 pages], epoxidized soybean oil [Sahakaro, K, at al. (2011) *Rubber Chemistry and Technology,* 84, 200-214], modified soybean oil through the reaction with dicyclopentadiene to convert carbon double bonds of the soybean oil molecules into norbornyl groups of different ratios [Li, J., et al. (2015) *Polymer,* 60, 144-158 and Li, J., (2016) *Rubber Chemistry and Technology,* 89, 606-630]. US 2016/0272795 A1 discloses that modification of soybean oil to form norbornylized soybean of is necessary in order to reach appropriate plasticizing properties for rubber compositions. Both norbornene and dicyclopentadiene being petroleum-based molecules, the modified oils cannot be considered fully derived from renewable sources. US 2018/0148567 A1 discloses a soybean oil enriched in oleic acid, used in replacement of a conventional soybean oi as a suitable plasticizer for rubber compositions to improve their mechanical properties.

The modification of vegetable oils is also disclosed in U.S. Pat. No. 8,989,454 B2 for the production of oligomeric glycerides where the molecular weight and the functionalities can be adjusted with a certain degree of freedom, depending from the type of rubber for which the resulting plasticizer is intended. Such vegetable oil derivatives are commercialized for rubber applications, e.g. under Trade name Matrilox™, as partial replacement of the traditional petroleum-based plasticizers [Pellizzari B. et al. (2017) *Elastomery,* 21, 159-166].

EP 3251872 A1 discloses esters of fatty acids (not only triglycerides) used in tire application as partial replacement of petroleum-derived plasticizers, but one of the drawbacks of these plasticizers is the low viscosity which causes the oil bleeding in the finished product.

Esters of dimer acids with simple monofunctional alcohols are reported in the literature mainly as lubricants and lubricant additives for engines and machineries (U.S. Pat. Nos. 2,673,184, 2,849,399). Aromatic esters of dimer acids were reported as lubricant and hydraulic fluids additives (U.S. Pat. No. 3,555,057). Quite comprehensive review on the applications of some esters of dimer acids as lubricant additive and as corrosion or rust inhibitor can be found in [E. C. Leonard, (ed.) *"The Dimer Acids" Humko Sheffield Chem.* 1975]. Documents US2003/0220426 and US200710077443 disclose the use of dimer and trimer esters in combination with an adhesive resin, such as melamine-containing resin or a phenol, as an adhesion promoter to promote adhesion of rubber to metal and polymeric substrates, such as cords. No reports could be found regarding the application of dimer and trimer esters as plasticizers of rubber compositions for tire application in general and in tire tread application in particular. Only one patent (U.S. Pat. No. 7,109,264) reports the use of dimer and trimer acid esters as plasticizers for elastomer compositions. However, all the formulations, applications and testing conditions detailed in this patent are specific to technical articles like V-belts, radiator hoses, automotive insulation, seals and gaskets. In particular, the elastomers illustrated in this patent provide mechanical properties to the rubber composition that are not appropriate for tire applications. For example, this patent does not report any tire and tire tread formulation, does not report any dynamic measurement for the determination of the elastic modulus (E'), viscous modulus (E") and the resulting tan δ (the ratio E"/E'). The latter dynamic parameters are representative of tire and tire tread applications since they allow to measure the viscoelastic properties of the rubber compounds and, in the case of tire tread application, to predict traction and rolling resistance in any weather conditions. Because of the completely lack of any viscoelastic measurement in the U.S. Pat. No. 7,109,264 there is no disclosure of an improvement of the viscoelastic properties of the rubber composition thanks to the dimer and trimer acid esters.

In this context, there is a need for rubber compositions for tire application in general and tire tread application in particular, comprising effective plasticizers fully produced from renewable sources. There is indeed a need for rubber compositions for tire application wherein the traditional petroleum-based plasticizers like the treated distillate aromatic extract (T-DAE) and the mild (or medium) extract solvate (MES) are completely replaced, even at high loading, by an efficient plasticizer from renewable source.

SUMMARY OF THE INVENTION

The present invention relates to a rubber composition for tire applications comprising:
  rubber polymer(s) comprising at least optionally functionalized styrene-butadiene rubber and at least one rubber selected from polybutadiene rubber (BR), natural rubber (NR), polyisoprene rubber (IR) and mixtures thereof, and optionally one or more rubbers, and
  at least one acid derived from renewable sources selected from trimer and/or dimer acids having the formula A-$(COOH)_q$, with q being 2 or 3 and A being identical or different, acyclic, cyclic or polycyclic, saturated or unsaturated, linear or branched hydrocarbon groups having from 3 to 69 carbon atoms or at least one ester derived from renewable sources resulting from the esterification of trimer and/or dimer acids having the formula A-$(COOH)_q$, with q being 2 or 3 and A being an acyclic, cyclic or polycyclic, saturated or unsaturated, linear or branched hydrocarbon group having from 3 to 69 carbon atoms, with acyclic or cyclic, saturated or unsaturated, linear or branched alcohols.

Preferably, the rubber composition for tire applications of the invention comprises:
  rubber polymer(s) comprising at least styrene-butadiene rubber and optionally at least one rubber selected from polybutadiene rubber (BR), natural rubber (NR), polyisoprene rubber (IR) and mixtures thereof, and optionally one or more rubbers, and
  at least one ester derived from renewable sources resulting from the esterification of trimer and/or dimer acids having the formula A-$(COOH)_q$, with q being 2 or 3 and A being an acyclic, cyclic or polycyclic, saturated or unsaturated, linear or branched hydrocarbon group having from 3 to 69 carbon atoms, with acyclic or cyclic, saturated or unsaturated, linear or branched alcohols.

According to a particular embodiment, the ester(s) derived from renewable sources comprise(s), based on the total weight of the ester(s), from 50 to 100 wt %, preferably from 75 to 100 wt % of at least one trimer ester resulting from the esterification of trimer acids having the formula A-$(COOH)_3$, with A being an acyclic, cyclic or polycyclic, saturated or unsaturated, linear or branched hydrocarbon group having from 3 to 69 carbon atoms, with acyclic or cyclic, saturated or unsaturated, linear or branched alcohols.

According to a particular embodiment, the at least one ester derived from renewable sources comprises:
  At least one trimer ester, preferably in an amount, based on the total weight of the ester(s) derived from renewable sources, of from 50 to 99% wt, more preferably from 75 to 99% wt, said trimer ester(s) resulting from the esterification of trimer acids having the formula A-$(COOH)_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols; and
  at least one dimer ester, preferably in an amount, based on the total weight of the ester(s) derived from renewable sources, of from 1 to 50 wt %, more preferably from 1 to 25 wt %, said dimer ester(s) resulting from the esterification of dimer acid(s) dimer acids having the formula A-$(COOH)2$, with A being identical or different, acyclic, cyclic or polycyclic, saturated or unsaturated, linear or branched hydrocarbon groups having from 3 to 46 carbon atoms, with acyclic or cyclic, saturated or unsaturated, linear or branched alcohols.

According to a particular embodiment, the trimer and/or dimer acids result from one or more addition reactions of unsaturated fatty acids.

According to a particular embodiment, the unsaturated fatty acids have from 4 to 24 carbon atoms (C4 to C24), preferably from 11 to 22 carbon atoms (C11 to C22), more preferably 16 to 18 carbon atoms (C16 to C18).

According to a particular embodiment, the unsaturated fatty acids have 18 carbon atoms (C18).

According to a particular embodiment, the unsaturated fatty acids are chosen from oleic acid, linoleic acid, linolenic acid, and mixtures thereof.

According to a particular embodiment, the unsaturated fatty acids are obtained from Tall Oil Fatty Acid.

According to a particular embodiment, the acyclic or cyclic, saturated or unsaturated, linear or branched alcohols are chosen from ethanol, 1-nonanol, lauryl alcohol, stearyl alcohol, tetrahydrofurfuryl alcohol, and mixtures thereof.

According to a particular embodiment, the rubber polymers comprise:
  from 20 to 90% by weight, preferably from 30 to 80% by weight, more preferably from 40 to 70% by weight, of styrene-butadiene rubber and
  from 10 to 80% by weight, preferably from 20 to 70% by weight, more preferably from 30 to 60% by weight, of at least one rubber selected from polybutadiene rubber (BR), natural rubber (NR), polyisoprene rubber (IR) and mixtures thereof,
based on the total weight of the rubber polymers.

According to a particular embodiment, the rubber composition comprises from 5 to 80 PHR, preferably from 20 to 60 PHR, more preferably from 30 to 44 PHR of ester derived from renewable sources.

The invention also relates to the use of an acid derived from renewable sources selected from trimer and/or dimer acids having the formula A-$(COOH)_q$, with q being 2 or 3 and A being identical or different, acyclic, cyclic or polycyclic, saturated or unsaturated, linear or branched hydrocarbon groups having from 3 to 69 carbon atoms to plasticize a rubber composition comprising from 20 to 90% wt of optionally functionalized styrene-butadiene rubber(s) (SBR)

and from 10 to 80% of at least one rubber selected from polybutadiene rubber (BR), natural rubber (NR), polyisoprene rubber (IR) and mixtures thereof, based on the total weight of the rubber composition.

The invention also relates to the use of an ester derived from renewable sources selected from trimer and/or dimer esters resulting from the esterification of trimer acids having the formula $A\text{-}(COOH)_3$, with A being an acyclic, cyclic or polycyclic, saturated or unsaturated, linear or branched hydrocarbon group having from 3 to 69 carbon atoms, with acyclic or cyclic, saturated or unsaturated, linear or branched alcohols to plasticize a rubber composition comprising from 20 to 90% wt of optionally functionalized styrene-butadiene rubber(s) (SBR) and from 10 to 80% of at least one rubber selected from polybutadiene rubber (BR), natural rubber (NR), polyisoprene rubber (IR) and mixtures thereof, based on the total weight of the rubber composition.

The present invention also relates to a use of an ester derived from renewable sources comprising from 50 to 100 wt %, preferably from 75 to 100 wt % of at least one trimer ester resulting from the esterification of trimer acids having the formula $A\text{-}(COOH)_3$, with A being an acyclic, cyclic or polycyclic, saturated or unsaturated, linear or branched hydrocarbon group having from 3 to 69 carbon atoms, with acyclic or cyclic, saturated or unsaturated, linear or branched alcohols to plasticize a rubber composition comprising at least styrene-butadiene rubber.

The present invention also relates to a use of an acid derived from renewable sources comprising from 50 to 100 wt %, preferably from 75 to 100 wt % of at least one trimer acid having the formula $A\text{-}(COOH)_3$, with A being an acyclic, cyclic or polycyclic, saturated or unsaturated, linear or branched hydrocarbon group having from 3 to 69 carbon atoms, to plasticize a rubber composition comprising at least styrene-butadiene rubber.

Within the framework of the use of the invention, the rubber composition preferably has one or more of the features defined in the invention for the rubber composition. The present invention also relates to a tire tread comprising the rubber composition according to the invention.

The present invention also relates to a tire comprising the tire tread according to the invention.

It has now been found, and forms the object of the present invention, that plasticizers comprising trimer and/or dimer acid esters of the present invention are able to replace completely and even at high loading the traditional petroleum-based plasticizers used in tire application in general in tire treads application in particular. With respect to vegetable oils currently proposed as plasticizers for rubber compositions for tire application, plasticizers comprising trimer and/or dimer acid esters of the present invention provide clear and evident added values in tire tread performances and larger degree of freedom in the formulation design to the rubber compounder, which overcome by far the performances and potentiality of vegetable oils.

In order to illustrate the invention, a series of highly viscous esters were prepared and tested in tire tread compositions as straight replacement not only of T-DAE and MES oil plasticizers but also of sunflower oil plasticizer (characterized by high oleic content), without any compromise in the mechanical and dynamical performances of the tire tread. Furthermore, al the limitations due to the low viscosity of the straight chain fatty esters, as well as their tendency to crystallization at low temperatures were overcome by the plasticizers comprising trimer and/or dimer acid ester which show unique low temperature properties.

DEFINITIONS

PHR, Parts per Hundred of Rubber polymer: unit used to quantify the amount of various ingredients present in a rubber composition, designating the number of parts by weight of each ingredient per hundred parts of rubber.

DETAILED DESCRIPTION OF THE INVENTION

The present invention pertains to rubber compositions for tire applications comprising esters obtained by reacting acids derived from renewable sources with a series of aliphatic alcohols also derived from renewable sources.

Typically, the acids derived from renewable sources are obtained by reacting unsaturated fatty acids and consist in a mixture of unreacted fatty acids, fatty acid dimers, and/or fatty acid trimers at different concentrations, as will be detailed below.

Dimer and Trimer Acids from Renewable Sources

Dimer and trimer acids are respectively dicarboxylic and tricarboxylic acids which can be derived from the catalytic oligomerization of unsaturated fatty adds when heated for example in presence of a montmorillonite clay under nitrogen purge and autogenous pressure. The typical raw materials for the preparation of dimer and trimer acids is the tall oil fatty acids mixture. However, other unsaturated fatty acids mixtures can be used, like for example soybean oil or, with a tailor made balance between the linoleic and oleic acids as described for example in the U.S. Pat. No. 4,052,425. Temperatures as high as 300° C. can be reached and some water (e.g. 2% by weight) can be added to the reaction mixture to prevent the undesired decarboxylation reaction. A comprehensive review on the synthesis, structure elucidation and application of dimer and trimer acids can be found in E. C. Leonard (ed.) "The Dimer Acids" Humko Sheffield Chem. 1975. More recent reviews can be found in T. E. Breuer, in "Concise Encyclopedia of Chemical Technology" edited by J. Kroschwitz, Wiley, 1999, pp. 624 and in F. D. Gunstone, "The Lipid Handbook, $3^{rd}$ ed." CRC Press 2007, pp 564. This review lists the main chemical structures which are present in commercial dimer and trimer adds.

These dimer and trimer acids not only are derived from completely renewable sources but are completely non-toxic by ingestion and are neither corrosive, nor skin and eye irritants [Breuer, cit.].

Figure 1:
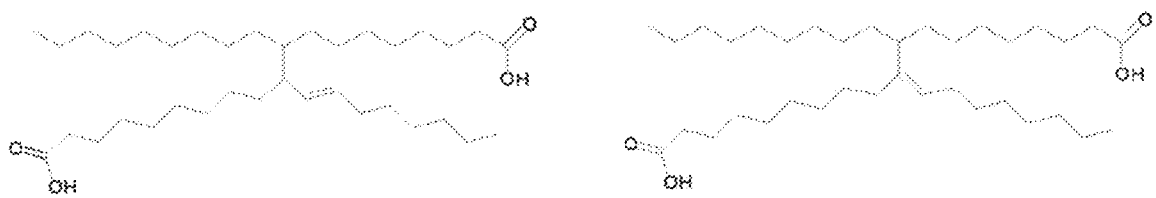
FIG. 1 represents the schematic structures of acyclic dimer acid (other structures are also possible) [E. C. Leonard, cit.].

Typically, the dimer and trimer acids useful for the invention have the formula $A\text{-}(COOH)_q$, with q being 2 or 3 and A being an acyclic, cyclic or polycyclic, saturated or unsaturated, linear or branched hydrocarbon group of 3 to 69 carbon atoms, resulting for example from one or more addition reactions of unsaturated fatty adds. Acyclic dimer and timer acids may result from the polymerization of unsaturated fatty acids. Examples of acyclic dimer acids resulting from the dimerization of unsaturated fatty acids are represented in FIG. 1.

According to a particular embodiment, the dimer and trimer acids are obtained by addition on the unsaturated fatty acids double bonds according to the Diels-Alder reaction.

Figure 2:
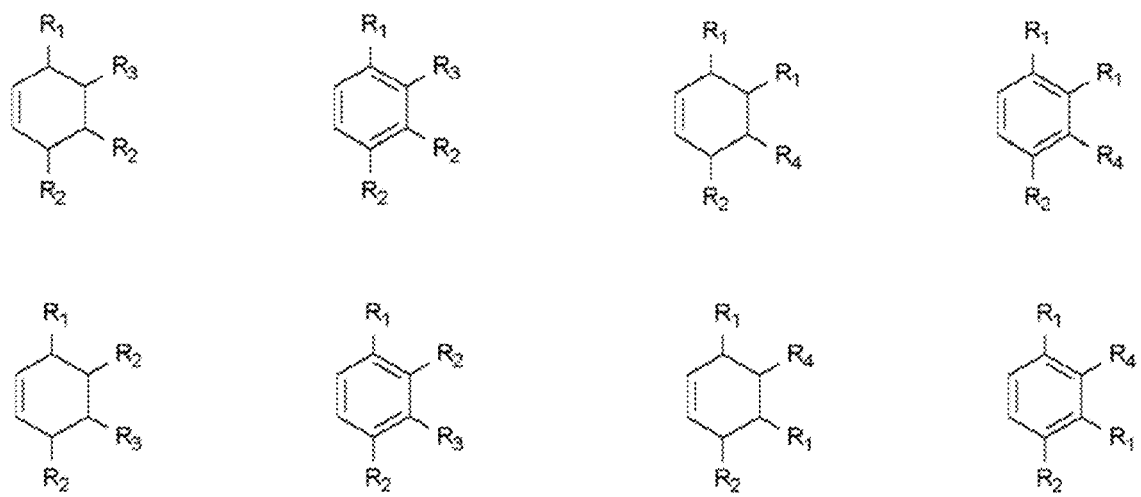
FIG. 2 represents the schematic structures of tetrasubstituted monocyclic dimers, each dimer containing two free carboxylic functional groups [E. C. Leonard, cit.].

Monocyclic dimer acids may be obtained by Diels-Alder addition on unsaturated fatty adds dimers. Examples of four different monocyclic dimer acids resulting from the intramolecular Diels-Alder addition of unsaturated fatty acid dimers are represented in FIG. 2. The obtained structures are tetrasubstituted cyclohexene structures.

Besides, for each cyclohexene structure, a minor component 1,2,3,4-tetrasubstituted benzene ring may be formed (see FIG. 2), which derives from hydrogen-shift side reactions. This hydrogen shift is promoted by the clay catalysis at high temperature and autogenous pressure which leads to dehydrogenation, aromatization and hydrogen. Furthermore, each of the four cyclohexene isomers in FIG. 2 has 16 equatorial or axial isomeric possible structures, giving a total of 64 cyclohexene-based isomers [E. C. Leonard (ed.) cit.].

Figure 3:
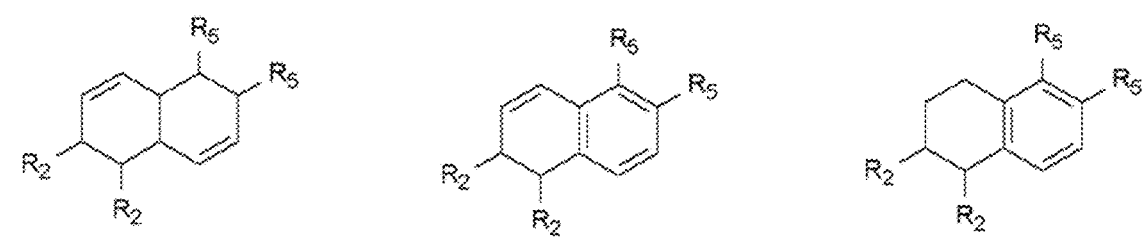
FIG. 3 represents the schematic structures of tetrasubstituted bicyclic dimers (head-to head isomers), each dimer containing two free carboxylic functional groups [E. C. Leonard, cit.].

Bicyclic dimers acids may be obtained by successive Diels-Alder additions on unsaturated fatty acids dimers. Examples of bicyclic dimers which derive from intramolecular cyclization of acyclic dimer are shown in FIG. 3. A typical bicyclic dimer acid structure is based on 1,2,5,6-tetrasubstituted-1,2,5,6,4a,8a-hexahydro-naphthalene molecular skeleton (FIG. 3, left). This basic structure allows the co-existence of numerous isomers. The mentioned typical bicyclic dimer (and isomers) may be accompanied by a minor fraction constituted by an aromatic ring condensed with a cyclohexene ring (FIG. 3, center) or cyclohexane ring (FIG. 3, right) due to hydrogen-shift reaction. These two structures can be named as 1,2,5,6-tetrasubstituted-1,2-dihydronaphthalene and 1,2,5,6-tetrasubstituted-1,2-tetra-hydronaphthalene or 1,2,5,6-tetrasubstituted-tetralin respectively. The aromatic fraction is always a minor component with respect to the cycloaliphatic fraction.

Figure 4:
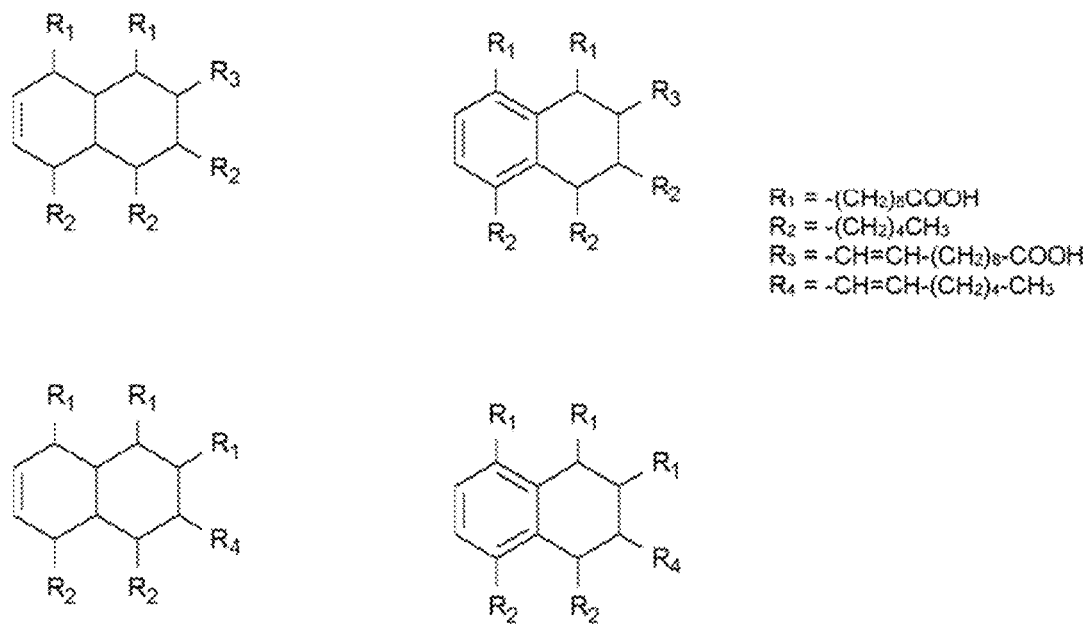
FIG. 4 represents the schematic structures of bicyclic timer acids derived from isomerized linoleic acid addition to the monocyclic dimer acids. Many isomers are possible as well as the relative minor aromatic fraction. Only some of the possible structures are considered for illustrative purposes.

Further Diels-Alder addition of a suitable fatty add, e.g. isomerized linoleic acid, to the monocyclic dimer acids leads to bicyclic trimer acids. Examples of bicyclic trimer acids are shown in FIG. 4. The structures of trimer acids are based on 1,2,3,4,5,8-hexasubstituted-1,2,3,4,5,8,4a,8a-octahydronaphthalene molecular skeleton. Also in this case many isomers are possible as well as a minor aromatic fraction based on 1,2,3,4,5,8-hexasubstituted-1,2,3,4-tetrahydronaphthalene or 1,2,3,4,5,8-hexa-substitutedtetralin. Trimer acids are characterized by three carboxylic functionalities per single molecule in contrast with two carboxylic functionalities per molecule in the case of dimer acids.

Figure 5:
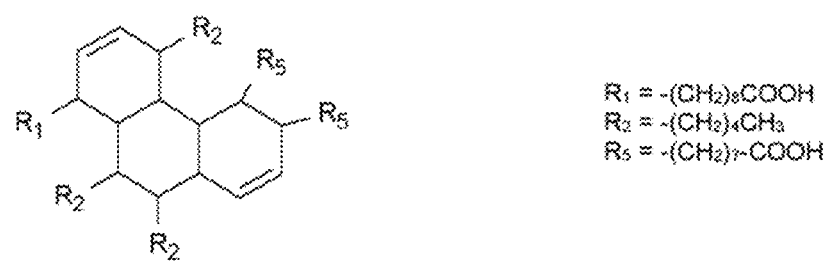
FIG. 5 represents the schematic structure of tricyclic trimer acids derived from isomerized linoleic acid addition to the bicyclic dimer acids. Many isomers are possible as well as the relative minor aromatic fraction. Only some of the possible structures are considered for illustrative purposes.

As shown in FIG. 4, trimer acids are predominantly bicyclic but tricyclic structures are also possible when, for example, isomerized linoleic acid is added to the bicyclic dimer of FIG. 3. In this case, trimer acids with tricyclic structures are obtained as shown in FIG. 5. The resulting structure is based on 3,4,5,8,9,10-hexasubstituted-3,4,4a,4b,5,8,8a,9,10,10a-decahydro-phenanthrene.

Preferably, the unsaturated fatty acids useful for the present invention are unsaturated fatty acids having 11 to 22 carbon atoms (C11 to C22), preferably 16 to 18 carbon atoms (C16 to C18).

Among the unsaturated fatty acids used, there may be mentioned, for example, crotonic acid (C4), isocrotonic acid (C4), tiglic acid (C5), sorbic acid (C6), undecylenic acid (C11), hypogeic acid (C16), palmitoleic acid (C16), hiragonic acid (C16), oleic acid (C18), linoleic acid (C18), linolenic acid (C18), γ-linolenic acid (C18), elaidic acid (C18), eleostearic acid (C18), parinaric acid (C18), vaccenic acid (C18), petroselinic acid (C18), arachidonic acid (C20), gadoleic acid (C20), gondoic acid (C20), homo-γ-linolenic acid (C20), cetoleic acid (C22), erucidic acid (C22), brassidic acid (C22), clupanodonic acid (C22), nervonic acid (C24) taken alone or in a mixture. A complete list of unsaturated fatty acids can be found in [F. D. Gunstone, cit.]

More preferably, the unsaturated fatty acids are unsaturated fatty acids having 18 carbon atoms (C18), in particular chosen from oleic acid, linoleic acid, linolenic acid taken alone or in a mixture.

Unsaturated fatty acids may be obtained from TOFA (Tal Oil Fatty Acid) that is typically rich in oleic acids and linoleic acids. It is either possible to use one type of fatty acids or a mixture containing several different fatty acids.

Depending on the experimental conditions used for the one or more addition reactions of unsaturated fatty acids, a mixture containing unreacted fatty acids A-(COOH), fatty acid dimers A-(COOH)$_2$, or fatty acid trimers A-(COOH)$_3$ at different concentrations can be obtained, A being an acyclic, cyclic or polycyclic, saturated or unsaturated, linear or branched hydrocarbon group having from 3 to 69 carbon atoms.

When the unsaturated fatty acids used have 18 carbon atoms (C18), the dimer acids formed by addition are dicarboxylic acids having 36 carbon atoms, among which 2 free carboxylic functional groups showing a monocyclic cycloaliphatic or aromatic structure as shown in FIG. 2 or a bicyclic naphthenic or aromatic structure as shown in FIG. 3.

Similarly, when the unsaturated fatty acids used have 18 carbon atoms (C18), the trimer acids formed by successive additions are tricarboxylic acids having 54 carbon atoms, among which 3 free carboxylic functional groups with chemical structures characterized by bicyclic structures as shown in FIG. 4 or tricyclic structures as shown in FIG. 5.

The chemical structures of dimer and trimer acids result from a series of Diels-Alder addition reactions, while the aromatic structures can result from hydrogen shift reaction caused by clay catalysis. The hydrogen-shift reaction is a side reaction and the aromatic structures thus formed represent a minor fraction in the dimer and trimer acids mixture.

Dimer and trimer acids can be prepared from the catalytic polymerization of tall oil fatty acids or similar mixtures, commercially available from Croda B.V. under trade names Pripol 1017 and Pripol 1040 respectively, or similar products from Emery such as Emery 2003 and Emery 2016, and esterified with straight chain alcohols all available from renewable sources. Pripol 1045 and Pripol 1025 from Croda B.V. can also be mentioned as commercially available mixtures of dimer and trimer acids. These esters are able to replace completely the traditional petroleum-based plasticizers such as T-DAE and MES or even the sunflower oil plasticizer, yielding surprisingly excellent static and dynamic mechanical properties as expected for a tire tread application, without any compromise which instead were necessary (i.e. partial and not full replacement of the petroleum-based plasticizers) for the application of other straight chain ester-based plasticizers.

Dimer and trimer acids are typically available as mixtures of monomer, dimer and trimer acids. When dimer acids are preponderant (i.e. more than 50% wt) in the mixture, it is called "dimer acid" but it generally contains at least a small fraction of trimer acids and monomer acids.

The monomeric fraction of dimer and trimer acids is composed of straight and branched chain fatty acids with an important degree of residual unsaturation. A typical branched chain fatty acid formed during clay-catalyzed dimerization and trimerization is isostearic acid [E. C. Leonard, cit].

An example of commercially available "dimer acid" is Pripol 1017 from Croda B.V. whose specification is shown in Table 1 and is composed by 1-3 wt % monomer fatty acids, 75-80 wt % dimer acids (with the chemical structures shown in FIGS. 1, 2 and 3) and 18-22 wt % trimer acids (with chemical structures shown in FIGS. 4 and 5). When trimer acids are preponderant (i.e. more than 50% wt) in the mixture, it is called "trimer acids". An example of commercially available "trimer acids" is Pripol 1040 from Croda B.V. with the relative specification shown in Table 1 and composed of 0-5 wt % monomer fatty acids, 0-25 wt % dimer acids (with the chemical structures shown in FIGS. 1, 2 and 3) and 75-100 wt % trimer acids (with chemical structures shown in FIGS. 4 and 5). In Table 1 below, the typical composition of dimer and trimer acids industrially produced from Croda B.V. are summarized. Similar mixtures or pure products of dimer and trimer acids are also available from other companies. For the implementation of the present invention, the Pripol products from Croda B.V. and especially those reported in Table 1 were specifically used. As shown in Table 1, a dimer acid with a high purity can be obtained by distillation of standard "dimer acid", like Pripol 1012 and Pripol 1013 from Croda, as well as the hydrogenated standard dimer acid like Pripol 1025 whose specification is shown in Table 1 as well. In table 1 below, the specification of a mixture of dimer and trimer acids like Pripol 1045 is mentioned.

Table 1 below summarizes the commercial names and technical specifications of dimer and trimer acids that may be used for implementing the present invention.

TABLE 1

| | Specifications of commercial dimer and trimer acids | | | | |
|---|---|---|---|---|---|
| Trivial name | "Dimer Acid" | Distilled "Dimer acid" | "Trimer Acid" | Hydrogenated "Dimer Acid" | Dimer/trimer mixture |
| Commercial name | Pripol 1017 Croda | Pripol 1013 Croda | Pripol 1040 Croda | Pripol 1025 Croda | Pripol 1045 Croda |
| Acid value (mg KOH/g) | 190-197 | 194-198 | 184-194 | 192-197 | 180-200 |
| Saponification value (mg KOH/g) | 195-202 | n.d. | 195-205 | 195-202 | n.d. |
| Colour Gardner | 8 max | 5 max | 16 typical | 2 max | 14 typical |
| Monomer wt % | 1-3 | 0-0.2 | 0-5 | 1-3 | 4 typical |
| Dimer wt % | 75-80 | 95-98 | 0-25 | 75-80 | 40-45 |
| Trimer wt % | 18-22 | 2-4 | 75-100 | 18-22 | 52-57 |
| viscosity 25° C. (cPs) | 7700-8700 | 7100 typ | 45000 typ | 8900 | 23000 typ |

To illustrate the present invention, esters were synthesized starting from "dimer acid" and "trimer acids" commercially available and originated from Croda B.V. It is outlined that other mixtures of dimer and trimer fatty acids (including also monomer acid fraction) in any molar proportion including pure dimer as well as the hydrogenated dimer and trimer fatty acids, again in any proportion as raw materials for the ester synthesis with alcohols from renewable sources are also encompassed in the scope of the present invention.

According to an embodiment of the invention, the rubber composition comprises acids derived from renewable sources in an amount, based on the total weight of the acids(s) derived from renewable source, ranging from 30 to 70% wt of trimer acid(s) and from 30 to 70% wt of dimer acid(s),
said trimer acids having the formula $A-(COOH)_3$, with A being identical or different, acyclic, cyclic or polycyclic, saturated or unsaturated, linear or branched hydrocarbon group having from 3 to 69 carbon atoms, and said dimer acids having the formula $A-(COOH)_2$, with A being identical According to an embodiment, the alcohol(s) used in the invention are selected from alcohol(s) comprising from 1 to 30 carbon atoms, preferably from 2 to 24 carbon atoms, more preferably from 2 to 20 carbon atoms.

The alcohol(s) can be selected from acyclic alcohol(s), cyclic alcohol(s) and mixtures thereof. According to an embodiment, the alcohol(s) used in the invention are selected from acyclic alcohol(s) comprising from 1 to 30 carbon atoms, preferably from 2 to 24 carbon atoms, more preferably from 2 to 20 carbon atoms.

Table 2 below shows a selection of alcohols which are produced from renewable sources. All the alcohols that were selected to illustrate the invention in the examples are widely available and produced from renewable sources.

TABLE 2

Examples of alcohols obtainable from renewable sources

| ALCOHOL NAME | OTHER NAME | FORMULA | MELTING POINT (° C.) | BOILING POINT (° C.) | SOURCES |
|---|---|---|---|---|---|
| methanol | | $CH_3OH$ | −97.8 | 64.6 | by dry distillation of wood |
| ethanol | | $CH_3CH_2OH$ | −114 | 78.4 | by sugars fermentation |
| 1-propanol | | $CH_3(CH_2)_2OH$ | −127 | 97.1 | present in fusel oil |
| 1-butanol | | $CH_3(CH_2)_3OH$ | −122 | 117.5 | by butanol-acetonic fermentation of cereals and sugars |
| 3-methylbutanol | isoamyl alcohol | $(CH_3)_2CHCH_2CH_2—OH$ | −117 | 131 | present in fusel oil |
| 2 methyl-1-butanol | sec-butylcarbynol | $CH_3CH_2CH(CH_3)—CH_2—OH$ | <−70 | 132 | present in fusel oil |
| 1-heptanol | | $CH_3(CH_2)_5OH$ | −34.6 | 176 | from castor oil |
| 2-ethylhexanol | octyl alcohol | $CH_3(CH_2)_3CH(C_2H_5)CH_2OH$ | | 184.3 | from acetaldehyde followed by hydrogenation |
| 1-octanol | | $CH_3(CH_2)_7OH$ | −16 | 195 | by-product in coconut fatty acids hydrogenation |
| 1-nonanol | pelargonyl alcohol | $CH_3(CH_2)_8OH$ | −5.5 | 213.5 | from ozonolysis of oleic and other suitable unsaturated fatty acids followed by hydrogenation |
| 10-undecen-1-ol | | $CH_2=CH—(CH_2)_9—OH$ | −3 | 247 | from castor oil |
| 1-undecanol | undecyl alcohol | $CH_3(CH_2)_{10}OH$ | 19 | 243 | from castor oil and hydrogenation |
| 1-dodecanol | lauryl alcohol | $CH_3(CH_2)_{11}OH$ | 24 | 257 | from hydrogenation of coconut oil or palm kernel oil |
| 1-tetradecanol | myristyl alcohol | $CH_3(CH_2)_{13}OH$ | 37.5 | 264 | from hydrogenation of coconut oil |
| 1-hexadecanol | cetyl alcohol | $CH_3(CH_2)_{15}OH$ | 49.3 | 344 | from reduction of palmitic acid |
| 1-octadecanol | stearyl alcohol | $CH_3(CH_2)_{17}OH$ | 58 | 160 @ 1 torr | from reduction of stearic acid |
| | cetostearyl alcohol | $CH_3(CH_2)_{15}OHCH_3(CH_2)_{17}OH$ | 43 | | commercial mixture of cetyl and stearyl alcohols |
| tetrahydro-furfuryl alcohol | THFA | (tetrahydrofuran ring with $CH_2OH$) | <−80 | 178 | By hydrogenation of furfural obtained from certain biomass (oat hulls, sugarcane bagasse, corn cobs, rice husks, etc . . . ) | or different, acyclic, cyclic or polycyclic, saturated or unsaturated, linear or branched hydrocarbon groups having from 3 to 46 carbon atoms.

Alcohols from Renewable Sources

Dimer and timer of fatty acids derived from renewable sources, and their mixtures, were esterified with alcohols also derived from renewable sources. The resulting esters of trimer/dimer fatty acids fully produced from renewable sources are effective plasticizers of rubber composition for tire application in general and tire tread application in particular.

For the esterification of dimer and trimer acids, a selection of alcohols available from renewable sources may be used.

According to a particular embodiment, the dimers and trimers of fatty acids are esterified with an alcohol selected from methanol, ethanol, 1-propanol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, tetrahydrofurfuryl alcohol or mixtures thereof. According to a preferred embodiment, the dimers and trimers of fatty acids are esterified with an alcohol selected from ethanol, 1-nonanol, 1-dodecanol, 1-octadecanol, tetrahydrofurfuryl alcohol or mixtures thereof.

According to a particular embodiment, the dimers and trimers of fatty acids are esterified with an alcohol selected from methanol, ethanol, 1-propanol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, or mixtures thereof. According to a preferred embodiment, the dimers and trimers of fatty acids are esterified with an alcohol selected from ethanol, 1-nonanol, 1-dodecanol, 1-octadecanol, or mixtures thereof.

Ethanol is widely available and can be obtained from sugars, starch cereals alcoholic fermentation. n-Butanol can be produced by acetone-butanol-ethanol (ABE) fermentation using glucose or starch as renewable starting materials but the availability from the ABE source is still relatively limited and n-butanol is more generally obtained through chemical synthesis from other non-renewable sources. Pentanol is more commonly known as amyl alcohol and is a mixture of isomers, i.e. 3-methylbutan-1-ol $(CH_3)_2$ $CHCH_2CH_2$—OH and 2-methylbutan-1-ol $CH_3CH_2CH$ $(CH_3)CH_2$—OH which are by-products of alcoholic fermentation of sugars and are the main components of fusel oil which is the residue of ethanol distillation. Pelargonyl alcohol or 1-nonanol can be obtained from the ozonolysis of oleic acid and other suitable unsaturated fatty acids followed by hydrogenation of the resulting pelargonic acid to 1-nonanol. Lauryl alcohol or 1-dodecanol can be obtained from the widely available palm kernel and from coconut oil fatty acids which, after fractionation and hydrogenation, yield lauryl alcohol. Cetyl alcohol is known also as palmityl alcohol or 1-hexadecanol and can be obtained from pain oil fatty acids after fractionation and hydrogenation. Stearyl alcohol or 1-octadecanol can be obtained from stearic acid after hydrogenation. Cetostearyl alcohol is a commercial mixture of cetyl and stearyl alcohols. Tetrahydrofurfuryl alcohol can be obtained from hydrogenation of furfural, the latter being derived by a simple chemical treatment from certain biomass (oat hulls, sugarcane bagasse, corn cobs, rice husks, etc. . . . ).

Since alcohols from renewable sources are used for the esterification of dimer and trimer acids also from renewable sources, the esters that are produced are derived from renewable sources, and preferably exclusively from renewable sources.

Esters Obtained from Acids and Alcohols from Renewable Sources

It has been surprisingly found, and forms the object of the present invention that esters derived from renewable sources that may be obtained from clay catalysis oligomerization of unsaturated fatty acids from renewable sources once esterified with alcohols also from renewable sources, as those summarized in Table 2, yield a series of esters which act as effective plasticizers in rubber compositions for tire application in general and in tire tread compositions in particular.

Typically, the ester(s) derived from renewable sources is (are) trimer and/or dimer ester(s) prepared by esterification of trimer and/or dimer acid(s) having the formula $A\text{-}(COOH)_q$, with q being 2 or 3 and A being identical or different, acyclic, cyclic or polycyclic, saturated or unsaturated, linear or branched hydrocarbon groups having from 3 to 69 carbon atoms, with acyclic or cyclic, saturated or unsaturated, linear or branched alcohols. According to an embodiment, the dimer and/or the trimer acid(s) comprises at least one acid of formula $A\text{-}(COOH)_q$, with q being 2 or 3 and A being identical or different, acyclic, cyclic or polycyclic, saturated, linear or branched hydrocarbon groups having from 3 to 69 carbon atoms.

According to a particular embodiment, the ester(s) derived from renewable sources comprise(s), based on the total weight of the esters, from 50 to 100 wt %, preferably from 75 to 100 wt % of trimer esters prepared by esterification of trimer acids having the formula $A\text{-}(COOH)_3$, with A being identical or different, acyclic, cyclic or polycyclic, saturated or unsaturated, linear or branched hydrocarbon groups having from 3 to 69 carbon atoms, with acyclic or cyclic, saturated or unsaturated, linear or branched alcohols.

According to a particular embodiment, the ester(s) derived from renewable sources comprise(s), based on the total weight of the esters, from 50 to 100 wt %, preferably from 75 to 100 wt % of trimer esters prepared by esterification of trimer acids having the formula $A\text{-}(COOH)_3$, with A being identical or different, acyclic, cyclic or polycyclic, saturated or unsaturated, linear or branched hydrocarbon groups having from 3 to 51 carbon atoms, with acyclic or cyclic, saturated or unsaturated, linear or branched alcohols.

According to a particular embodiment, the ester(s) derived from renewable sources comprise(s), based on the total weight of the esters, from 50 to 100 wt %, preferably from 75 to 100 wt % of trimer esters prepared by esterification of trimer acids having the formula $A\text{-}(COOH)_3$, with A being identical or different, acyclic, cyclic or polycyclic, saturated or unsaturated, linear or branched hydrocarbon groups having from 3 to 69 carbon atoms, with acyclic or cyclic, saturated or unsaturated, linear or branched alcohols comprising from 1 to 30 carbon atoms.

According to a particular embodiment, the ester(s) derived from renewable sources comprise(s), based on the total weight of the esters, from 50 to 100 wt %, preferably from 75 to 100 wt % of trimer esters prepared by esterification of trimer acids having the formula $A\text{-}(COOH)_3$, with A being identical or different, acyclic, cyclic or polycyclic, saturated or unsaturated, linear or branched hydrocarbon groups having from 3 to 51 carbon atoms, with acyclic or cyclic, saturated or unsaturated, linear or branched alcohols comprising from 2 to 24 carbon atoms.

According to a particular embodiment, the ester(s) derived from renewable sources comprise(s), based on the total weight of the esters, from 50 to 99 wt %, preferably from 75 to 99 wt % of trimer esters prepared by esterification of trimer acids having the formula $A\text{-}(COOH)_3$ and from 1 to 50 wt %, preferably from 1 to 25 wt % of dimer acids having the formula $A\text{-}(COOH)_2$, with A being identical or different, acyclic, cyclic or polycyclic, saturated or unsaturated, linear or branched hydrocarbon groups having from 3 to 46 carbon atoms, with acyclic or cyclic, saturated or unsaturated, linear or branched alcohols.

According to a particular embodiment, the esters derived from renewable sources comprise, based on the total weight of the esters, from 50 to 99 wt %, preferably from 75 to 99 wt % of trimer esters prepared by esterification of trimer acids having the formula $A\text{-}(COOH)_3$ and from 1 to 50 wt %, preferably from 1 to 25 wt % of dimer acids having the formula $A\text{-}(COOH)_2$, with A being identical or different, acyclic, cyclic or polycyclic, saturated or unsaturated, linear or branched hydrocarbon groups having from 3 to 46 carbon atoms, with acyclic or cyclic, saturated or unsaturated, linear or branched alcohols comprising from 2 to 24 carbon atoms.

According to an embodiment of the invention, the rubber composition comprises, based on the total weight of the ester(s) derived from renewable source:

From 65 to 90% wt of trimer ester(s) and from 10 to 35% wt of dimer ester(s); or From 65 to 90% wt of dimer ester(s) and from 10 to 35% wt of trimer ester(s), said trimer esters resulting from the esterification of trimer acids having the formula $A\text{-}(COOH)_3$, with A being identical or different, acyclic, cyclic or polycyclic, saturated or unsaturated, linear or branched hydrocarbon group having from 3 to 69 carbon atoms, with an alcohol selected from methanol, ethanol, 1-propanol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, tetrahydrofurfuryl alcohol or mixtures thereof, and said dimer esters resulting from the esterification of dimer acid(s) dimer acids having the formula $A\text{-}(COOH)_2$, with A being identical or different, acyclic, cyclic or polycyclic, saturated or unsaturated, linear or branched hydrocarbon groups having from 3 to 46 carbon atoms, with an alcohol selected from methanol, ethanol, 1-propanol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, tetrahydrofurfuryl alcohol or mixtures thereof.

According to a preferred embodiment of the invention, the rubber composition comprises from 65 to 90% wt of trimer ester(s) and from 10 to 35% wt of dimer ester(s), said trimer esters resulting from the esterification of trimer acids having the formula $A\text{-}(COOH)_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols, and said dimer esters resulting from the esterification of dimer acid(s) dimer acids having the formula $A\text{-}(COOH)_2$, with A being identical or different, acyclic, cyclic or polycyclic, saturated or unsaturated, linear or branched hydrocarbon groups having from 3 to 46 carbon atoms, with an alcohol selected from methanol, ethanol, 1-propanol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, tetrahydrofurfuryl alcohol or mixtures thereof.

According to a particular embodiment of the invention, the rubber composition comprises from 65 to 90% wt of trimer ester(s) and from 10 to 35% wt of dimer ester(s), said trimer esters resulting from the esterification of trimer acids having the formula A-(COOH)3, with A being identical or different, acyclic, cyclic or polycyclic, saturated, linear or branched hydrocarbon group having from 3 to 69 carbon atoms, with acyclic or cyclic, saturated or unsaturated, linear or branched alcohols, and said dimer esters resulting from the esterification of dimer acid(s) dimer acids having the formula A-(COOH)2, with A being identical or different, acyclic, cyclic or polycyclic, saturated, linear or branched hydrocarbon groups having from 3 to 46 carbon atoms, with an alcohol selected from methanol, ethanol, 1-propenol, 1-butanol, 3-methylbutanol, 2 methyl-1-butanol, 1-heptanol, 2-ethylhexanol, 1-octanol, 1-nonanol, 10-undecen-1-ol, 1-undecanol, 1-dodecanol, 1-tetradecanol, 1-hexadecanol, 1-octadecanol, tetrahydrofurfuryl alcohol or mixtures thereof.

Plasticizer Useful for the Invention

The acids and esters defined in the present invention are useful as a plasticizer for plasticizing a rubber composition.

According to a particular embodiment, the plasticizer useful for plasticizing a rubber composition of the invention comprises at least one trimer ester of fatty acids.

Typically, the plasticizer comprises at least one ester derived from renewable sources resulting from the esterification of dimer and/or trimer acids having the formula $A\text{-}(COOH)_q$, with q being 2 or 3 and A being an acyclic, cyclic or polycyclic, saturated or unsaturated, linear or branched hydrocarbon group having from 3 to 69 carbon atoms, with acyclic or cyclic, saturated or unsaturated, linear or branched alcohols.

The acids and esters defined in the present invention can be used to plasticize a rubber composition for tire applications comprising rubber polymers, wherein the rubber polymers comprise:

from 20 to 90% by weight of styrene-butadiene rubber(s) optionally functionalized and from 10 to 80% by weight of at least one rubber selected from polybutadiene rubber (BR), natural rubber (NR), polyisoprene rubber (IR) and mixtures thereof, based on the total weight of the rubber polymers.

According to a particular embodiment, the acids and esters defined in the present invention are used to improve the viscoelastic properties of the rubber composition. In particular, the acids and esters defined in the present invention allow to affect the elastic modulus E' (also named storage modulus) as well as the viscous modulus E" (also named loss modulus) of rubber compositions for tire, consequently, the ratio between E" and E' (named tan delta) is also improved thanks to the acids and esters of the invention. In fact, in tire and moreover in tire tread application the determination of the dynamic properties of a rubber compound (i.e. the determination of E', E" and tan δ) in a wide temperature range (applying the time-temperature superposition principle, well known to the experts in the art) allows to predict the behavior of the said rubber compound in terms of winter performances, wet and dry traction and rolling resistance.

According to an embodiment, the rubber composition comprises from 10 to 90 PHR of silica, preferably from 40 to 80 PHR of silica, more preferably from 50 to 75 PHR of silica.

According to an embodiment, the rubber composition comprises from 5 to 50 PHR, preferably from 10 to 40 PHR, more preferably from 20 to 30 PHR of carbon black, preferably of carbon black selected from grade N375, grade N220, grade N234 or grade N134 carbon black or mixtures thereof, as determined according to ASTM D1765-18.

Preferably, the rubber composition comprises one or more of the features defined in the present invention.

More particularly, the acids and esters defined in the present invention can be used alone, in particular without a phenol or a melamine resin, in order to plasticize the rubber compositions specifically designed for tire and moreover for tire tread application, more particularly with the precise purpose to improve the viscoelastic properties of the rubber composition.

Rubber Composition of the Invention

The rubber composition of the invention comprises at least one rubber polymer and at least one plasticizer comprising esters obtained from acids and alcohols from renewable sources, as detailed above.

The rubber composition of the invention comprises at least one rubber polymer and at least one compound selected from timer and/or dimer esters of fatty acids and mixtures thereof.

Typically, the rubber polymer is selected from optionally functionalized styrene-butadiene rubber (SBR), polybutadiene rubber (BR), natural rubber (NR), polyisoprene rubber (IR) and mixtures thereof.

According to an embodiment, the styrene-butadiene rubber (SBR) used in the invention is functionalized. Preferably, when the styrene-butadiene rubber (SBR) is functionalized, the functional groups may comprise atoms selected from oxygen, nitrogen, phosphorous, sulfur, silicon, and mixture thereof, preferably from oxygen and silicon atoms and mixture thereof.

According to an embodiment, functional groups may be selected from epoxy groups, mono-, di-, trialkoxysilane groups, and mixture thereof. Preferably, the functional group of SBR contains one alkoxysilane group and one epoxy group, preferably one trialkoxysilane and one glycidyl group. Among alkoxysilane, mention may be made of methoxysilane and ethoxysilane.

Examples of functional groups may be (3-Glycidyloxypropyl)trimethoxysilane and (3-Glycidyloxypropyl)triethoxysilane.

According to an embodiment, the functionalized SBR comprises randomly distributed styrene and butadiene.

According to an embodiment, the functional groups are groups that are able to react with the silica surface.

Preferably, the functionalized SBR comprises at least one functional group per polymer chain, preferably only one functional group per polymer chain. According to an embodiment, the styrene-butadiene rubber (SBR) is functionalized at the omega chain end only.

The rubbers used in the present invention may be commercially available. The rubber polymer can be in the form of a dry powder or in the form of an of extended rubber. Typically, in the case of a functionalized styrene-butadiene rubber, the rubber will be in the form of an of extended rubber.

According to a particular embodiment, the rubber composition of the invention comprises as rubber polymer(s) at least one styrene-butadiene rubber (SBR) and at least one rubber selected from polybutadiene rubber (BR), natural rubber (NR), polyisoprene rubber (IR) and mixtures thereof.

According to a particular embodiment, the rubber polymers further comprise nitrile rubbers and/or butyl rubbers and/or ethylene/propylene/diene polymer (EPDM) and/or neoprene (polychloroprene).

According to another embodiment, the rubber polymers consist in SBR and one or more rubber selected from BR, NR, IR and mixtures thereof. In other word, according to a preferred embodiment, the rubber polymers do not comprise rubber that are different from SBR, BR, NR, or IR.

According to an embodiment, the rubber polymers comprise styrene-butadiene rubber and natural rubber.

According to an embodiment, the rubber polymers comprise styrene-butadiene rubber (SBR) and polybutadiene rubber (BR).

According to an embodiment, the rubber polymers comprise styrene-butadiene rubber (SBR), polybutadiene rubber (BR) and natural rubber (NR).

According to an embodiment, the rubber polymers comprise at least 20% by weight, preferably at least 30% by weight, more preferably at least 40% by weight of styrene-butadiene rubber, based on the total weight of the rubber polymers.

According to an embodiment, the rubber polymers comprise:
from 20 to 90% by weight of optionally functionalized styrene-butadiene rubber(s) and
from 10 to 80% by weight of at least one rubber selected from polybutadiene rubber (BR), natural rubber (NR), polyisoprene rubber (IR) and mixtures thereof,
based on the total weight of the rubber polymers.

According to an embodiment, the rubber polymers consist in:
from 20 to 90% by weight of optionally functionalized styrene-butadiene rubber(s) and
from 10 to 80% by weight of one or more rubbers selected from polybutadiene rubber (BR), natural rubber (NR), polyisoprene rubber (IR) and mixtures thereof,
from 0 to 30% by weight of one or more other rubbers selected from butyl rubber, nitrile rubber, EPDM, neoprene, and mixture thereof,
based on the total weight of the rubber polymers.

According to an embodiment, the rubber polymers consist in:
from 20 to 90% by weight of optionally functionalized styrene-butadiene rubber(s) and
from 10 to 80% by weight of one or more rubbers selected from polybutadiene rubber (BR), natural rubber (NR), polyisoprene rubber (IR) and mixtures thereof,
based on the total weight of the rubber polymers.

According to an embodiment, the rubber polymer(s) comprise:
from 30 to 95% by weight, preferably from 40 to 90% by weight, more preferably from 45 to 85% by weight of optionally functionalized styrene-butadiene rubber (SBR);
from 5 to 70% by weight, preferably from 10 to 60% by weight, more preferably from 15 to 55% by weight of natural rubber (NR),
based on the total weight of the rubber polymers.

According to an embodiment, the rubber polymer(s) comprise:
from 20 to 90% by weight, preferably from 30 to 80% by weight, more preferably from 40 to 70% by weight of optionally functionalized styrene-butadiene rubber (SBR);
from 10 to 80% by weight, preferably from 20 to 70% by weight, more preferably from 30 to 60% by weight of polybutadiene rubber (BR),
based on the total weight of the rubber polymers.

According to an embodiment, the rubber polymer(s) comprise:
from 20 to 85% by weight, preferably from 30 to 75% by weight, more preferably from 40 to 85% by weight of optionally functionalized styrene-butadiene rubber (SBR);
from 10 to 80% by weight, preferably from 20 to 70% by weight, more preferably from 30 to 80% by weight of polybutadiene rubber (BR).
from 5 to 70% by weight, preferably from 10 to 50% by weight, more preferably from 15 to 30% by weight of natural rubber (NR),
based on the total weight of the rubber polymers.

According to an embodiment, the rubber polymer(s) comprise:
from 30 to 95% by weight, preferably from 40 to 90% by weight, more preferably from 45 to 85% by weight of styrene-butadiene rubber (SBR);
from 5 to 70% by weight, preferably from 10 to 60% by weight, more preferably from 15 to 55% by weight of natural rubber (NR),
based on the total weight of the rubber polymers.

According to an embodiment, the rubber polymer(s) comprise:
from 20 to 90% by weight, preferably from 30 to 80% by weight, more preferably from 40 to 70% by weight of styrene-butadiene rubber (SBR);
from 10 to 80% by weight, preferably from 20 to 70% by weight, more preferably from 30 to 60% by weight of polybutadiene rubber (BR),
based on the total weight of the rubber polymers.

According to an embodiment, the rubber polymer(s) comprise:
- from 20 to 85% by weight, preferably from 30 to 75% by weight, more preferably from 40 to 85% by weight of styrene-butadiene rubber (SBR);
- from 10 to 80% by weight, preferably from 20 to 70% by weight, more preferably from 30 to 60% by weight of polybutadiene rubber (BR),
- from 5 to 70% by weight, preferably from 10 to 50% by weight, more preferably from 15 to 30% by weight of natural rubber (NR), based on the total weight of the rubber polymers.

According to a preferred embodiment, the rubber polymers comprise less than 20% by weight of ethylene/propylene/diene polymer (EPDM), preferably less than 20% wt, more preferably less than 10% wt, even more preferably less then 5% wt, ideally less than 1% wt, of ethylene/propylene/diene polymer (EPDM), based on the total weight of the rubber polymers. According to an embodiment, the rubber polymers do not comprise EPDM.

According to a preferred embodiment, the rubber polymers comprise less than 20% by weight of neoprene (polychloroprene), preferably less than 20% wt. more preferably less than 10% wt, even more preferably less than 5% wt, ideally less than 1% wt, of neoprene, based on the total weight of the rubber polymers. According to an embodiment, the rubber polymers do not comprise neoprene.

Preferably, the rubber composition comprises from 10 to 90% wt of rubber polymer(s), preferably from 20 to 75% wt of rubber polymer(s), more preferably from 30 to 60% wt of rubber polymer(s), based on the total weight of the rubber composition.

According to a particular embodiment, the polybutadiene rubber is a cis-1,4-polybutadiene rubber, more particularly a high cis-1,4-polybutadiene rubber obtained with neodymium-based catalyst (Nd-BR).

According to a particular embodiment, the styrene-butadiene rubber polymer is Europrene R72613/Versalis.

According to a particular embodiment, the polybutadiene rubber Nd-BR is (Europrene BR40/Versalis.

According to a particular embodiment, the natural rubber NR is cis-1,4-polyisoprene SIR-10—Standard Indonesian Rubber grade 10.

According to a particular embodiment, the polyisoprene rubber is a synthetic polyisoprene rubber, preferably a synthetic cis-1,4-polyisoprene rubber.

Typically, the rubber composition is based on a blend of one or more rubber polymers, generally in the form of a solution, filed with a blend of silica and carbon black.

According to a particular embodiment, the silica is a high dispersion type Ultrasil 7000 from Evonik.

According to an embodiment, the rubber composition comprises from 10 to 90 PHR of silica, preferably from 40 to 80 PHR of silica, more preferably from 50 to 75 PHR of silica.

Typically, the carbon black may a standard carbon black, for example grade N375, grade N220, grade N234 or grade N134 carbon black or mixtures thereof, as determined according to ASTM D1785-18.

Preferably, if carbon black of grade N330, N326, N550 and/or N762 are present in the rubber composition of the invention, they are present in a combined (i.e. total) amount of less than 30 PHR, preferably less than 20 PHR, more preferably less than 10 PHR, even more preferably less than 5 PHR. The grade being determined according to ASTM D1765-18.

According to an embodiment, the rubber composition comprises from 5 to 50 PHR, preferably from 10 to 40 PHR, more preferably from 20 to 30 PHR of carbon black, preferably of carbon black selected from grade N375, grade N220, grade N234 or grade N134 carbon black or mixtures thereof, as determined according to ASTM D1765-18.

According to an embodiment of the invention, the rubber composition comprises:
- rubber polymers as defined in the present invention,
- from 5 to 80 PHR of esters as defined in the present invention, preferably from 20 to 60 PHR, more preferably from 30 to 44 of esters as defined above.
- from 5 to 50 PHR, preferably from 10 to 40 PHR, more preferably from 20 to 30 PHR of carbon black, preferably of carbon black selected from grade N375, grade N220, grade N234 or grade N134 carbon black or mixtures thereof, and
- from 10 to 90 PHR of silica, preferably from 40 to 80 PHR of silica, more preferably from 50 to 75 PHR of silica.

Other ingredients of standard grades for the rubber industry are coupling agents, e.g. silane coupling agent, zinc oxide, stearic acid, paraffin wax, antiozonant/antioxidant, accelerator, secondary accelerator and crosslinker, e.g. sulphur crosslinker.

One example of silane coupling agent is Si-69 type. One example of antiozonant/antioxidant is N-(1,3-dimethylbutyl)-N'-phenyl-1,4-phenylenediamine (6PPD). One example of accelerator is N-cyclohexyl-2-benzothiazole-sulfenamide (CBS). One example of secondary accelerator is diphenylguanidine DPG).

A typical rubber composition of the invention comprises from 5 to 80 PHR, preferably from 20 to 60 PHR, from 30 to 44 PHR, preferably from 34 to 40 PHR, more preferably about 37 PHR of ester(s) obtained from acids and alcohols from renewable sources, as detailed above.

According to a preferred embodiment, the rubber composition of the invention comprises from 20 to 90 PHR, preferably from 40 to 80 PHR, preferably from 80 to 70 PHR, preferably from 63 to 67 PHR, more preferably about 85 PHR of filer(s).

The rubber composition of the invention can be used in tires including passenger cars ties (PSR or PCR) and truck/bus tires (TBR).

According to a preferred embodiment, the rubber composition of the invention can be used in passenger cars tires and in particular in passenger cars tire treads.

Tires and tire treads can be prepared according to well known method for the skilled person, starting from the rubber composition of the invention.

In the following examples, the synthesis of a series of esters of trimer and/or dimer acids are reported and embodied in the current invention.

EXAMPLES

In examples 1-8, the product Pripol 1040 from Croda B.V. was selected as starting material for the esters synthesis as shown in Table 3. In examples 9-16. Pripol 1017 from Croda B.V. was employed as starting material in the esters synthesis as summarized in Table 3. The following examples wherein Pripol 1040 and Pripol 1017 are selected do not excludes to use other Pripol products listed in Table 1 as raw materials for the esters synthesis for this invention the, which indeed are embodied in the present invention. The synthesis of the Pripol 1040 esters and Pripol 1017 esters was conducted in the following 16 examples in a selected alcohol/free carboxylic functionality molar ratio suitable to lead the complete esterification of the free carboxylic groups of the dimer and trimer acids present in the products. In other words, the physical properties of the esters obtained according to the examples 1-18 are reported in Table 3. They are characterized by the absence of any free carboxylic group, since all the carboxylic groups were esterified with an alcohol. The acid value of the esters obtained in examples 1-16 and reported in Table 3 is always zero in contrast to the acid value of 184-194 mg KOH/g of the dimer/trimer acid mixture Pripol 1040 and in contrast to the acid value of 190-197 mg KOH/g of the dimer/trimer acid mixture Pripol 1017.

Example 1—Dimer and Trimer Ester of Ethanol

Pripol 1040 from Croda B.V. (400 g) (dimer and trimer acids mixture with trimer preponderance ≈75% min) was transferred together with an ion exchange resin catalyst Amberlyst 15 dry in hydrogen form (16.8 g) into a 2 L round bottomed three necked flask equipped with mechanical stirrer, a dropping funnel and a Dean-Stark trap with a tap at the bottom. The Dean-Stark trap was surmounted by a refluxing condenser equipped at the top with anhydrous calcium chloride valve. Absolute ethanol (180 mL, purity 99.5% from Merck) and toluene (220 mL, purity 99.7% from Aldrich) were added to the reaction mixture which was heated into an external oil bath kept at 112° C. Stirring was set at 450 rpm and gradually brought to 675 rpm. Heating and stirring were prolonged for 14 h and in the last hour a slight vacuum was applied (at the top of the reflux condenser) intermittently to accelerate the azeotrope distillation. A total of 215 mL or ternary azeotrope (toluene, ethanol, water) was collected. The degree of esterification was checked by FT-IR spectroscopy since the free carboxylic acid absorbs at 1710 $cm^{-1}$ while the ester at about 1738 $cm^{-1}$. At this stage the degree of esterification was found at about 80%. Additional 100 mL of absolute ethanol were added through the dropping funnel into the reaction flask and heating at 112° C. in the oil was prolonged further 12 h. Other 50 mL of azeotropic distillate were collected in the Dean-Stark trap. The achievement of complete esterification was confirmed by FT-IR spectroscopy. The Amberlyst 15 resin was then separated from the reaction product by filtration and afterwards the product was distilled first under atmospheric pressure until 135° C. removing all excess of ethanol and then under vacuum at 50 torr and 220° C. removing toluene and all volatile matter. The quality of the resulting ester was checked again with FT-IR spectroscopy showing exclusively a sharp peak at 1738 $cm^{-1}$. The mass of ester obtained was 556.9 g.

Example 2—Dimer and Trimer Ester of 1-butanol

Using the same equipment as detailed in the example 1, Pripol 1040 from Croda B.V. (403.9 g) was heated with a cationic resin catalyst Amberlyst 15 dry acid form (25.5 g), with 1-butanol (230 mL purity >99.5% from Merck) and toluene (250 mL, purity 99.7% from Aldrich). The reaction mixture was heated in an oil bath kept at 112° C. and stirring was increased gradually from 250 rpm to 600 rpm. After 6 h heating vacuum was applied intermittently starting the recovery of the toluene/water azeotrope. After 5 h further heating at 120° C. and intermittent vacuum, the degree of esterification estimated from the amount of recovered reaction water was next to the theoretical. The degree of esterification was checked also by FT-IR showing the completion of the reaction. Thus, the Amberlyst 15 resin was separated by filtration. The reaction mixture was distilled first under atmospheric pressure and then under reduced pressure reaching 20 torr and 205° C. removing toluene and also all the excess of 1-butanol present in the mixture. The quality of the resulting ester was checked again with FT-IR spectroscopy showing exclusively a sharp peak at 1738 $cm^{-1}$. The mass of ester obtained was 460.8 g.

Example 3—Dimer and Trimer Ester of Amyl Alcohol

Using the same equipment as detailed in the example 1. Pripol 1040 from Croda B.V. (409.4 g) was heated with a cationic resin catalyst Amberlyst 15 dry acid form (30.0 g), amyl alcohol (260 mL technical grade from Riedel de Haen) and toluene (480 mL, purity 99.7% from Aldrich). The reaction mixture was heated in an oil bath kept at 112° C. and stirring was increased gradually from 250 rpm to 750 rpm. After 6 h heating, vacuum was applied intermittently starting the recovery of the toluene/water azeotrope. After 5 h further heating at 120° C. and intermittent vacuum, the degree of esterification estimated from the amount of recovered reaction water was next to the theoretical. The degree of esterification was checked also by FT-IR showing the completion of the reaction. Thus, the Amberlyst 15 resin was separated by filtration. The reaction product was distilled first under atmospheric pressure and then under reduced pressure reaching 20 torr and 205° C. removing toluene and also all the excess of amyl alcohol present in the mixture. The quality of the resulting 15 ester was checked again with FT-IR spectroscopy showing exclusively a sharp peak at 1738 $cm^{-1}$. The mass of ester obtained was 489.3 g.

Example 4—Dimer and Trimer Ester of Pelargonyl Alcohol or 1-nonanol

Using the same equipment as detailed in the example 1, Pripol 1040 from Croda B.V. (404.0 g) was heated with a cationic resin catalyst Amberlyst 15 dry acid form (30.5 g), nonyl alcohol (360 mL purity >98% from Merck) and toluene (480 mL, purity 99.7% from Aldrich). The reaction mixture was heated in an oil bath kept at 112° C. and stirring was increased gradually from 250 rpm to 550 rpm. After 3 h heating vacuum was applied intermittently starting the recovery of the toluene/water azeotrope. After 5 h heating and intermittent vacuum, the degree of esterification estimated from the amount of recovered reaction water next to the theoretical. The degree of esterification was checked also by FT-IR showing the completion of the reaction. Thus, the Amberlyst 15 resin was separated by filtration. The reaction product was distilled first under atmospheric pressure and then under reduced pressure reaching 20 torr and 205° C. removing toluene and also all the excess of 1-nonanol present in the mixture. The quality of the resulting ester was checked again with FT-IR spectroscopy showing exclusively a sharp peak at 1738 $cm^{-1}$. The mass of ester obtained was 728.0 g.

Example 6—Dimer and Trimer Ester of Lauryl Alcohol or 1-dodecanol

Using the same equipment as detailed in the example 1, Pripol 1040 from Croda B.V. (467.8 g) was heated with a cationic resin catalyst Amberlyst 15 dry acid form (39.5 g), lauryl alcohol (299.0 g purity >98% from Sigma-Aldrich) and toluene (500 mL, purity 99.7% from Aldrich). The reaction mixture was heated in an oil bath kept at 112° C. and stirring was increased gradually from 250 rpm to 750 rpm. After 4.5 h heating vacuum was applied intermittently starting the recovery of the toluene/water azeotrope. The oil temperature was increased to 116° C. and vacuum was applied again after 10 h heating collecting 19 mL of water and 160 mL of toluene. Temperature was brought to 120° C. and heating prolonged for 9 h (total heating 19 h) when the recovered water was 27.1 mL. The degree of esterification was checked also by FT-IR showing the completion of the reaction. Thus, the Amberlyst 15 resin was separated by filtration. The reaction product was distilled under reduced pressure 20 torr and 220° C. removing toluene and all volatile matter. The quality of the resulting ester was checked again with FT-IR spectroscopy showing exclusively a sharp peak at 1738 cm$^{-1}$. The mass of ester obtained was 728.0 g.

Example 6—Dimer and Trimer Ester of Cetyl Alcohol or 1-hexadecanol

Using the same equipment as detailed in the example 1. Pripol 1040 from Croda B.V. (418.0 g) was heated with a cationic resin catalyst Amberlyst 15 dry acid form (35.4 g), cetyl alcohol (342.1 g purity >95% from Merck) and toluene (555 mL, purity 99.7% from Aldrich). The reaction mixture was heated in an oil bath kept at 112° C. and stirring was increased gradually from 250 rpm to 700 rpm. Heating was prolonged for 11 h and vacuum was applied intermittently recovering 19 mL of reaction water and an the toluene which was dried on anhydrous sodium sulfate. The day after the recovered and dried toluene (400 mL) was added again to the reaction mixture which was brought again at 112° C. and 700 rpm and kept in these conditions for other 12 h. Vacuum was applied intermittently until the collected reaction water was 24 mL The degree of esterification was checked by FT-IR spectroscopy which confirmed the value derived from the reaction water i.e. 96%. The Amberlyst resin was filtered out when the reaction mixture was still warm and the residual ester trapped in the resin was collected by washing with dry toluene. The reaction product was distilled under reduced pressure 20 torr and 220° C. removing toluene and all volatile matter. The quality of the resulting ester was checked again with FT-IR spectroscopy showing exclusively a sharp peak at 1738 cm$^{-1}$. The mass of ester obtained was 7282 g.

Example 7—Dimer and Trimer Ester of Stearyl Alcohol or 1-octadecanol

Using the same equipment as detailed in the example 1, Pripol 1040 from Croda B.V. (412.0 g) was heated with a cationic resin catalyst Amberlyst 15 dry acid form (35.0 g), stearyl alcohol (376.9.1 g purity 95% from Aldrich) and toluene (455 mL, purity 99.7% from Aldrich). The reaction mixture was heated in an oil bath kept at 115° C. and stirring was increased gradually from 250 rpm to 500 rpm. Heating was prolonged for 12 h and vacuum was applied intermittently recovering 21 ml of reaction water and 250 mL toluene which was dried on anhydrous sodium sulfate. The day after the recovered and dried toluene (200 mL) was added again to the reaction mixture which was brought again at 120° C. and 450 rpm and kept in these conditions for other 12 h. Vacuum was applied intermittently until the collected reaction water was 23.5 mL. The degree of esterification was checked by FT-IR spectroscopy which confirmed the value derived from the reaction water i.e. 96%. The Amberlyst resin was filtered out when the reaction mixture was still warm and the residual ester trapped in the resin was collected by washing with dry toluene. The reaction product was distilled under reduced pressure 20 torr and 220° C. removing toluene and all volatile matter. The quality of the resulting ester was checked again with FT-IR spectroscopy showing exclusively a sharp peak at 1738 cm$^{-1}$. The yield of the ester was 754.7 g.

Example 8—Dimer and Trimer Ester of Tetrahydrofurfuryl Alcohol or THFA

Using the same equipment as detailed in the example 1, Pripol 1040 from Croda B.V. (453.1 g) was heated with a cationic resin catalyst Amberlyst 15 dry acid form (34.3 g), tetrahydrofurfuryl alcohol (255 mL purity >98% from Aldrich) and toluene (500 mL, purity 99.7% from Aldrich). The reaction mixture was heated in an oil 40 bath kept at 112° C. and stirring was increased gradually from 250 rpm to 850 rpm. After 5 h heating vacuum was applied intermittently starting the recovery of the toluene/water azeotrope. After 10 h heating and intermittent vacuum, the temperature was increased to 120° C. and the completion of the esterification reaction was reached after 20 h total heating when the amount of reaction water was next to the theoretical value. The degree of esterification was checked also by FT-IR showing the completion of the reaction. Thus, the Amberlyst 15 resin was separated by filtration. The reaction product was distilled first under atmospheric pressure and then under reduced pressure reaching 20 torr and 205° C. removing toluene and also all the excess of tetrahydrofurfuryl alcohol present in the mixture. The quality of the resulting ester was checked again with FT-IR spectroscopy showing exclusively a sharp peak at 1738 cm$^{-1}$. The yield of the ester was 562.8 g.

Examples 9-18

Examples 9-16 correspond strictly to examples 1-8 detailed above with the unique change of dimer and trimer acids mixture from Pripol 1040 (with trimer as main component) to Pripol 1017 (having dimer acid as main component). The technical specification of Pripol 1040 and Pripol 1017 are shown in Table 1.

Examples 17-18 correspond strictly to example 5 with the unique change of dimer and trimer acids mixture from Pripol 1040 to respectively Pripol 1045 and Pripol 1025. The technical specification of Pripol 1045 and Pripol 1025 are shown 1 Table 1.

TABLE 3

Physical properties of the reference plasticizers and esters of the invention

| Examples | Reference plasticizer or dimer/trimer acid | Alcohol | Alcohol chain length | Density at 15° C. ASTM D4052 (kg/m$^3$) | Cleveland Open Cup Flash Point ASTM D92 (° C.) | Kinematic viscosity 100° C. ASTM D445 (mm$^2$/s) | Aniline Point ASTM D611 (° C.) |
|---|---|---|---|---|---|---|---|
| Ref 1 | Plaxolene TD 346 (T-DAE) | | | 948.8 | >220 | 20 | 66 |

TABLE 3-continued

Physical properties of the reference plasticizers and esters of the invention

| Examples | Reference plasticizer or dimer/trimer acid | Alcohol | Alcohol chain length | Density at 15° C. ASTM D4052 (kg/m³) | Cleveland Open Cup Flash Point ASTM D92 (° C.) | Kinematic viscosity 100° C. ASTM D445 (mm²/s) | Aniline Point ASTM D611 (° C.) |
|---|---|---|---|---|---|---|---|
| Ref 2 | Plaxolene MS 132 (MES) | | | 914.1 | >220 | 15 | 95 |
| Ref 3 | Sunflower oil | glycerol | C3 | 922.2 | 332 | 7.78 | <20 |
| No 1 | Pripol 1040 | ethanol | C2 | 942.9 | 310 | 18.44 | <25 |
| No 2 | Pripol 1040 | 1-butanol | C4 | 932.4 | 320 | 18.17 | <25 |
| No 3 | Pripol 1040 | amyl alcohol | C5 | 932.0 | 292 | 20.31 | <25 |
| No 4 | Pripol 1040 | 1-nonanol | C9 | 918.1 | 290 | 21.73 | 29 |
| No 5 | Pripol 1040 | lauryl alcohol | C12 | 911.1 | 292 | 23.99 | 44.6 |
| No 6 | Pripol 1040 | cetyl alcohol | C16 | 905.3 | 302 | 29.0 | 66.1 |
| No 7 | Pripol 1040 | stearyl alcohol | C18 | | | | |
| No 8 | Pripol 1040 | THFA alcohol | ring | 991.3 | 302 | 40.95 | <25 |
| No 9 | Pripol 1017 | ethanol | C2 | 924.7 | 272 | 10.04 | <25 |
| No 10 | Pripol 1017 | 1-butanol | C4 | | | | |
| No 11 | Pripol 1017 | amyl alcohol | C5 | | | | |
| No 12 | Pripol 1017 | 1-nonanol | C9 | 905.8 | 232 | 12.84 | <25 |
| No 13 | Pripol 1017 | lauryl alcohol | C12 | | | | |
| No 14 | Pripol 1017 | cetyl alcohol | C16 | | | | |
| No 15 | Pripol 1017 | stearyl alcohol | C18 | | | | |
| No 16 | Pripol 1017 | THFA alcohol | ring | 977.9 | 244 | 20.45 | <25 |
| No 17 | Pripol 1045 | Lauryl alcohol | C12 | 907.1 | 316 | 20.2 | 44.7 |
| No 18 | Pripol 1025 | Lauryl alcohol | C12 | 897.8 | 204 | 14.6 | 47.6 |

Table 3 summarizes all the measured physical properties of the synthesized esters in comparison to the properties of the petroleum-based plasticizers T-DAE and MES and sunflower oil, taken as references.

As can be seen from Table 3, the measured kinematic viscosity at 100° C. of the esters based on Pripol 1040 (mainly trimer esters) was close to the kinematic viscosity at 100° C. of petroleum-based plasticizers T-DAE and MES. Consequently, ester based on Pripol 1040 were chosen to prepare tire tread compositions and test their mechanical properties.

Pripol 1045, Pripol 1040 and Pripol 1017 have also been formulated in a tire tread composition and tested for their mechanical properties, in particular for their dynamic properties.

The formulations and mechanical tests are reported below.

Examples of Application of the Synthesized Esters of the Invention in a Typical Tire Tread Composition Some of the esters of dimer and trimer acids reported in Table 3 were tested for their plasticizer properties in a tire tread rubber composition.

A typical passenger car tire tread formulation is shown in Table 4 and is based on a blend of solution styrene-butadiene (S-SBR) rubber dry type (i.e. not oil extended) from Versalis type Europrene sol R72613 with 25% styrene and 64% vinyl without functional groups, a high cis-1,4-polybutadiene obtained with neodymium-based catalyst (Nd-BR) type Europrene BR40 again from Versalis and natural rubber (cis-1,4-polyisoprene) SIR-10 type (Standard Indonesian Rubber grade 10). The selected formulation is filled with a blend of silica and carbon black as shown in Table 4. In particular, the silica was the high dispersion type Ultrasil 7000 from Evonik while carbon black was a standard ASTM grade N375. The other ingredients shown in Table 4 were all standard grades for the rubber industry, i.e. the silane coupling agent was Si-69 type, zinc oxide (ZnO), stearic acid, paraffin wax, antiozonant/antioxidant N-(1,3-dimethylbutyl)-N'-phenyl-1,4-phenylenediamine (6PPD), accelerator N-cyclohexyl-2-benzothiazolesulfenamide (CBS), secondary accelerator diphenylguanidine (DPG) and sulphur crosslinker.

Table 4 below summarizes the tested compositions according to the invention (Pripol 1040 ethyl ester prepared in the example 1, Pripol 1040 nonyl (or pelargonyl) ester prepared in the example 4, Pripol 1040 lauryl (or dodecyn ester prepared in the example 5, Pripol 1040 stearyl (or octadecyl) ester prepared in the example 7 and Pripol 1040 tetrahydrofurfuryl ester prepared in the example 8) and comparative compositions comprising petroleum-based plasticizers (T-DAE Plaxolene TD-346 from Total Fluides S.A. MES Plaxolene MS-132, from Total Fluides S.A.) or comprising a vegetable oil (sunflower oil from Cargill).

In the formulation reported in Table 4 the amount of free plasticizer was 37 PHR, a level purposely selected to evidence the performances of the new plasticizers in a very critical rubber tread formulation characterized by high filer and moreover high plasticizer loading.

TABLE 4

Rubber tread composition formulation for plasticizers testing

| Composition ingredients | R-A | R-B | R-C | R-D | R-E | R-F | R-G | R-H |
|---|---|---|---|---|---|---|---|---|
| | PHR (parts per 100 by weight of the rubber polymer) | | | | | | | |
| S-SBR (Europrene R72613) | 50.0 | | | | | | | |
| Nd-BR (Europrene BR40) | 35.0 | | | | | | | |
| Natural Rubber (SIR-10) | 15.0 | | | | | | | |
| Silica (Ultrasil 7000) | 65.0 | | | | | | | |
| Carbon Black N375 | 22.0 | | | | | | | |
| T-DAE Plaxolene TD-346 (Ref 1) | 37.0 | — | — | — | — | — | — | — |

TABLE 4-continued

Rubber tread composition formulation for plasticizers testing

| Composition ingredients | R-A | R-B | R-C | R-D | R-E | R-F | R-G | R-H |
|---|---|---|---|---|---|---|---|---|
| | PHR (parts per 100 by weight of the rubber polymer) | | | | | | | |
| MES Plaxolene MS-132 (Ref 2) | — | 37.0 | — | — | — | — | — | — |
| Pripol 1040 ethyl ester (No 1) | — | — | 37.0 | — | — | — | — | — |
| Pripol 1040 nonyl ester (No 4) | — | — | — | 37.0 | — | — | — | — |
| Pripol 1040 lauryl ester (No 5) | — | — | — | — | 37.0 | — | — | — |
| Pripol 1040 stearyl ester (No 7) | — | — | — | — | — | 37.0 | — | — |
| Pripol 1040 tetrahydro-furfuryl ester (No 8) | — | — | — | — | — | — | 37.0 | — |
| Sunflower oil (Ref 3) | — | — | — | — | — | — | — | 37.0 |
| Silane Si-69 | 7.0 | | | | | | | |
| ZnO | 4.0 | | | | | | | |
| Stearic Acid | 2.0 | | | | | | | |
| Paraffin Wax | 1.0 | | | | | | | |
| 6PPD | 1.5 | | | | | | | |
| CBS | 1.8 | | | | | | | |
| DPG | 1.8 | | | | | | | |
| Sulfur | 1.5 | | | | | | | |
| Total | 244.6 | | | | | | | |

Another typical passenger car tire tread formulation is shown in Table 4bis and is based on a blend of solution styrene-butadiene (S-SBR) rubber slightly oil extended with just 4.75% wt of T-DAE, from Arlanxeo (FX5000) comprising 21% styrene and 50% vinyl with a functional group (one functional group per chain end designed to react with silica), a high cis-1,4-polybutadiene obtained with neodymium-based catalyst (Nd-BR) type Europrene BR40 again from Versalis and natural rubber (cis-1,4-polyisoprene) SIR-10 type (Standard Indonesian Rubber grade 10). The selected formulation is filled with a blend of silica and carbon black as shown in Table 4. In particular, the silica was the high dispersion type Ultrasil 7000 from Evonik while carbon block was a standard ASTM grade N375. The other ingredients P in Table 4bis were all standard grades for the rubber industry, i.e. the silane coupling agent was Si-69 type, zinc oxide (ZnO), stearic acid, paraffin wax, antitozonant/antioxidant N-(1,3dimethylbut-N'-phenyl-1,4-phenylenediamine (6PPD), accelerator N-cyclohexyl-2-benzothiazole-sulfenamide (CBS), secondary accelerator diphenylguanidine (DPG) and sulphur crosslinker.

Table 4bis below summarizes the tested compositions according to the invention (Pripol 1040 lauryl ester prepared in the example 5, Pripol 1045 lauryl ester prepared in the example 17 Pripol 1017 lauryl (or dodecyl) ester prepared in the example 13, Pripol 1025 lauryl ester prepared in the example 18 and Pripol 1045 (acid form) detailed as example 19 and comparative compositions comprising petroleum-based plasticizers (T-DAE Plaxolene TD-346 from Total Fluides S.A. MES Plaxolene MS-132, from Total Fluides S.A.) or comprising a vegetable oil (sunflower oil from Cargill).

In the formulation reported in Table 4bis the amount of free plasticizer was 34.5 PHR, a level purposely selected to evidence the performances of the new plasticizers in a very critical rubber tread formulation characterized by high filler and moreover high plasticizer loading.

TABLE 4bis

Rubber tread composition formulation or plasticizers testing

| Composition ingredients | R'-A | R'-B | R'-E | R'-I | R'-J | R'-K | R'-L | R'-H |
|---|---|---|---|---|---|---|---|---|
| | PHR (parts per 100 by weight of the rubber polymer) | | | | | | | |
| S-SBR (FX5000 from ARLANXEO) | 52.5 | | | | | | | |
| Nd-BR (Europrene BR40) | 35.0 | | | | | | | |
| Natural Rubber (SIR-10) | 15.0 | | | | | | | |
| Silica (Ultrasil 7000) | 65.0 | | | | | | | |
| Carbon Black N375 | 22.0 | | | | | | | |
| T-DAE Plaxolene TD-346 (Ref 1) | 34.5 | — | — | — | — | — | — | — |
| MES Plaxolene MS-132 (Ref 2) | — | 34.5 | — | — | — | — | — | — |
| Pripol 1040 lauryl ester (No 5) | — | — | 34.5 | — | — | — | — | — |
| Pripol 1045 lauryl ester (No 17) | — | — | — | 34.5 | — | — | — | — |
| Pripol 1017 lauryl ester (No 13) | — | — | — | — | 34.5 | — | — | — |
| Pripol 1025 lauryl ester (No 18) | — | — | — | — | — | 34.5 | — | — |
| Pripol 1045 free carboxylic acid (see Table 1) | — | — | — | — | — | — | 34.5 | — |
| Sunflower oil (Ref 3) | — | — | — | — | — | — | — | 34.5 |
| Silane Si-69 | 7.0 | | | | | | | |
| ZnO | 4.0 | | | | | | | |
| Stearic Acid | 2.0 | | | | | | | |
| Paraffin Wax | 1.0 | | | | | | | |
| 6PPD | 1.5 | | | | | | | |
| CBS | 1.8 | | | | | | | |
| DPG | 1.8 | | | | | | | |
| Sulfur | 1.5 | | | | | | | |
| Total | 244.6 | | | | | | | |

Preparation of Rubber Compositions

Mixing of each rubber composition was performed in an internal 1.5 L mixer using two successive preparation phases well known to persons skilled in the art: a first phase of thermo-mechanical working or kneading ("nonproductive" phase) at high temperature, up to a maximum temperature of between 110° C. and 190° C., preferably between 130° C. and 180° C., followed by a second phase of mechanical working ("productive" phase) reaching a lower temperature, typically of less than 110° C., for example between 40° C. and 100° C. The crosslinking system is incorporated during the 'productive' phase.

Test Methods

Testing of the rubber compositions was performed according to ASTM and ISO test methods as follows. Rheometer curves were recorded on an oscillating disc rheometer (ODR) at 175° C. for 8 minutes according the general rules of ISO 3417 or the analogous ASTM D2048. The stress-strain and ultimate properties of rubber cued composition specimens (175° C. for 10 min) were tested according to the ISO 37: 2017 test method using dumbbell shaped specimens type 1A. The rate of the transverse was 200 mm/min (i.e traction speed). Aged stress-strain properties were determined on cured rubber slabs aged in an oven for 3 days at 100° C. using ISO 37: 2017 test method as detailed for the unaged samples.

The dynamic (i.e. visco-elastic) properties on the cured rubber compositions were measured on a Mettler-Toledo DMA machine model Star 1. The Dynamic Mechanical Analysis measurements were performed in temperature sweep from −100 to +100° C. at a heating rate of 2° C./min, in tension mode with 0.1% strain amplitude. The Tg on E' curve was determined following the ASTM E1640-13 (2018) test method.

Rheometer Tests

Rheometer data recorded on rubber tread compositions of Table 4 are reported in Table 5. The experimental data are divided in torque parameters in the upper part of the table and the kinetics data in the bottom part of the table. MH represents the maximum torque reached by the rheometer curve, while the ML is the minimum torque and MH-ML is the delta torque and it is an indication of the crosslinking density reached at the end of the cure.

TABLE 5

Rheometer data of the rubber tread compositions

| | R-A | R-B | R-C | R-D | R-E | R-F | R-G | R-H |
|---|---|---|---|---|---|---|---|---|
| Rheometer at 175° C. × 8 min-Torque parameters | | | | | | | | |
| MH (dN m) | 65.99 | 61.30 | 64.99 | 67.48 | 63.94 | 64.56 | 69.25 | 60.47 |
| ML (dN m) | 12.97 | 10.04 | 12.76 | 14.32 | 12.92 | 13.90 | 14.36 | 15.20 |
| MH-ML (dN m) | 53.02 | 51.26 | 52.23 | 53.16 | 51.02 | 50.66 | 54.89 | 45.27 |
| M10 (dN m) | 18.27 | 15.17 | 17.98 | 19.63 | 18.02 | 18.97 | 19.85 | 19.73 |
| M50 (dN m) | 39.48 | 35.67 | 38.87 | 40.90 | 38.43 | 39.23 | 41.81 | 37.83 |
| M90 (dN m) | 60.68 | 56.18 | 59.77 | 62.16 | 58.54 | 59.49 | 63.76 | 55.94 |
| Rheometer at 175° C. × 8 min-Kinetic parameters | | | | | | | | |
| tMH (min sek) | 7.58 | 7.58 | 7.58 | 7.56 | 7.59 | 7.58 | 7.58 | 7.59 |
| tML (min sek) | 0.54 | 0.47 | 0.49 | 0.50 | 0.50 | 0.54 | 0.56 | 0.44 |
| t2 (min sek) | 1.30 | 1.28 | 1.28 | 1.25 | 1.25 | 1.20 | 1.30 | 1.05 |
| t10 (min sek) | 2.16 | 2.18 | 2.03 | 1.58 | 2.08 | 2.11 | 2.16 | 1.36 |
| t50 (min sek) | 3.17 | 3.14 | 3.04 | 2.54 | 3.09 | 3.13 | 3.16 | 2.29 |
| t90 (min sek) | 5.21 | 5.22 | 5.36 | 5.15 | 5.15 | 5.19 | 5.46 | 5.23 |
| t98 (min sek) | 7.30 | 7.45 | 7.46 | 7.40 | 7.45 | 7.15 | 7.45 | 7.00 |

Looking at the MH values which correlate with moduli of cured compositions and at the MH-ML values, it appears that all the rubber compositions plasticized with Pripol 1040 esterified respectively with ethyl (R-C), nonyl (R-D), lauryl (R-E), stearyl (R-F) and THFA (R-G) alcohols show higher values than the reference rubber composition with sunflower oil. Furthermore, the compositions of the invention show a surprising alignment in the physical properties with the values obtained for the rubber compositions with reference T-DAE (Plaxolene TD-346).

In terms of cure kinetics data shown n the bottom par of Table 5, it can be seen that the reference rubber composition with sunflower oil (i.e. R-H) clearly shows faster curing.

TABLE 5bis

Rheometer data of the rubber tread compositions

| | R'-A | R'-B | R'-E | R'-I | R'-J | R'-K | R'-L | R'-H |
|---|---|---|---|---|---|---|---|---|
| Rheometer at 175°C. × 8 min-Torque parameters | | | | | | | | |
| MH (dN m) | 64.67 | 63.31 | 60.87 | 61.13 | 55.48 | 59.12 | 47.13 | 55.28 |
| ML (dN m) | 14.35 | 14.32 | 13.83 | 12.92 | 12.10 | 14.11 | 15.72 | 14.78 |
| MH-ML (dN m) | 50.32 | 49.00 | 47.04 | 48.21 | 43.38 | 45.01 | 31.41 | 40.50 |
| M10 (dN m) | 19.38 | 19.22 | 18.54 | 17.74 | 16.44 | 18.61 | 18.86 | 18.83 |
| M50 (dN m) | 39.51 | 38.82 | 37.36 | 37.02 | 33.79 | 36.61 | 31.43 | 35.03 |
| M90 (dN m) | 59.64 | 58.41 | 56.17 | 56.31 | 51.14 | 54.62 | 44.00 | 51.23 |

TABLE 5bis-continued

Rheometer data of the rubber tread compositions

|  | R'-A | R'-B | R'-E | R'-I | R'-J | R'-K | R'-L | R'-H |
|---|---|---|---|---|---|---|---|---|
| Rheometer at 175°C. × 8 min-Kinetic parameters | | | | | | | | |
| tMH (min sek) | 7.59 | 7.59 | 7.59 | 7.59 | 7.58 | 7.58 | 7.59 | 7.59 |
| tML (min sek) | 0.54 | 0.57 | 1.01 | 0.49 | 1.01 | 0.52 | 0.37 | 0.56 |
| t2 (min sek) | 1.24 | 1.30 | 1.30 | 1.30 | 1.42 | 1.27 | 0.55 | 1.30 |
| t10 (min sek) | 2.04 | 2.08 | 2.11 | 2.02 | 2.08 | 1.57 | 1.28 | 1.39 |
| t50 (min sek) | 2.52 | 2.58 | 3.01 | 2.53 | 2.59 | 2.47 | 3.01 | 2.29 |
| t90 (min sek) | 5.15 | 5.24 | 5.21 | 5.21 | 5.48 | 5.14 | 5.45 | 5.33 |
| t98 (min sek) | 7.24 | 7.36 | 7.12 | 7.12 | 7.48 | 7.30 | 7.48 | 7.48 |

The trends observed in Table 5 on the rubber compound series report in Table 4 are confirmed also in the case of the compound series of Table 4 bis. Also in this case the dimer/trimer lauryl esters (R'-E, R'-I, R'-J and R'-K) show in general higher MH and MH-ML values than sunflower oil (R'-H). Looking at the cure kinetics data, both the t10 and t50 confirm also in the case of the compounding loop of Table 4 bis that the sunflower oil gives faster curing than dimer/trimer lauryl esters (R'-E, R'-I, R'-J and R'-K) and even than the petroleum-based plasticizers R'-A and R'-B. A too fast curing may lead to a lower control of the cure.

Mechanical Properties

Table 6 below shows the unaged and aged moduli, tensile strength and elongation at break.

The compositions R-C to R-G according to the invention and the composition R-A with T-DAE do all show higher moduli, at any elongation, than the reference composition R-H with sunflower oil. The composition R-H with sunflower oil showing both a lower modulus and a higher elongation at break, this suggests that this plasticizer interferes with the sulphur-based rubber crosslinking mechanism leading to lower crosslinking density, which is consistent with the lowest value in MH-ML in Table 5.

The results in Table 6 show that the moduli of the compositions, with Pripol 1040 esters are aligned with the moduli of the composition prepared with T-DAE, and higher than the modulus of the reference composition R-H with sunflower oil

TABLE 6

Stress-strain and ultimate properties of the rubber tread compositions cured 8 min at 175° C. (unaged and aged 3 days at 100° C.)

|  | R-A | R-B | R-C | R-D | R-E | R-F | R-G | R-H |
|---|---|---|---|---|---|---|---|---|
| Unaged stress-strain properties | | | | | | | | |
| modulus 50% (MPa) | 1.73 | 1.44 | 1.62 | 1.75 | 1.68 | 1.66 | 1.67 | 1.45 |
| modulus 100% (MPa) | 3.21 | 2.76 | 2.92 | 3.22 | 3.17 | 3.07 | 2.96 | 2.41 |
| modulus 200% (MPa) | 7.43 | 6.50 | 6.73 | 7.37 | 7.40 | 7.01 | 6.81 | 5.13 |
| tensile strength (MPa) | 12.2 | 11.1 | 11.3 | 12.4 | 12.3 | 11.6 | 11.3 | 8.46 |
| tensile strength (MPa) | 13.8 | 11.7 | 13.9 | 13.7 | 14.6 | 14.5 | 13.6 | 15.8 |
| % Elongation@Break | 330 | 310 | 350 | 320 | 340 | 360 | 350 | 480 |
| 3 days aged at 100° C. stress-strain properties | | | | | | | | |
| aged modulus 50% (MPa) | 2.38 | 2.01 | 2.15 | 2.32 | 2.17 | 2.37 | 2.40 | 1.86 |
| aged modulus 100% (MPa) | 4.51 | 4.00 | 4.04 | 4.35 | 4.10 | 4.53 | 4.58 | 3.24 |
| aged modulus 200% (MPa) | 10.0 | 9.13 | 9.23 | 9.61 | 9.20 | 10.0 | 10.3 | 6.90 |
| aged tensile strength (MPa) | 12.5 | 11.1 | 12.0 | 12.1 | 12.4 | 12.7 | 12.8 | 12.6 |
| aged % Elongation@Break | 240 | 240 | 250 | 240 | 260 | 250 | 240 | 330 |
| % changes in physical properties from [aged/unaged ratio × 100] | | | | | | | | |
| modulus 50% (MPa) | 137.6 | 139.6 | 132.7 | 132.6 | 129.2 | 142.8 | 143.7 | 128.3 |
| modulus 100% (MPa) | 140.5 | 144.9 | 138.4 | 135.1 | 129.3 | 147.6 | 154.7 | 134.4 |
| modulus 200% (MPa) | 134.6 | 140.5 | 137.1 | 130.4 | 124.3 | 142.7 | 151.2 | 134.5 |
| tensile strength (MPa) | 90.6 | 94.9 | 86.3 | 88.3 | 84.9 | 87.6 | 94.1 | 79.7 |
| % Elongation@Break | 72.7 | 77.4 | 71.4 | 75.0 | 76.5 | 69.4 | 68.6 | 68.8 |

Based on these results of Table 6 and on the delta torque values of Table 5, it can be seen that the esters of the present invention match the performances of the petroleum-based plasticizers T-DAE and MES in a typical rubber tread composition and surpasses the reference composition from renewable source R-H comprising sunflower of.

First part of Table 6 shows also the unaged tensile strength and elongation at break of all compositions studied. The experimental data show that the tensile strength values measured on the rubber compositions of the invention are completely aligned to the value of the composition comprising T-DAE, while a trend to lower tensile strength is observed in the case of the composition comprising MES.

invention are matching the moduli, tensile strength and elongation of the aged rubber compositions prepared with petroleum-based T-DAE or MES oils. In other words, the aged data in Table 6 demonstrate experimentally that these esters do not have any negative effect on the rubber composition and do not cause any undesired accelerated ageing, suggesting once again that these esters from renewable sources are suitable plasticizers for rubber compositions for tire application and are effective replacements of the traditional petroleum-based plasticizers like T-DAE and MES without any compromise in unaged and aged mechanical properties.

TABLE 6bis

Stress-strain and ultimate properties of the rubber tread compositions cured 8 min at 175° C.
(unaged and aged 3 days at 100° C.)

|  | R'-A | R'-B | R'-E | R'-I | R'-J | R'-K | R'-L | R'-H |
|---|---|---|---|---|---|---|---|---|
| Unaged stress-strain properties | | | | | | | | |
| modulus 50% (MPa) | 1.99 | 2.05 | 1.93 | 1.74 | 1.87 | 1.82 | 1.93 | 1.49 |
| modulus 100% (MPa) | 3.66 | 3.91 | 3.66 | 3.16 | 3.48 | 3.40 | 2.95 | 2.57 |
| modulus 200% (MPa) | 8.15 | 8.61 | 7.90 | 6.82 | 7.49 | 7.56 | 5.59 | 5.50 |
| tensile strength (MPa) | 14.0 | 12.4 | 10.9 | 12.8 | 11.4 | 13.0 | 11.7 | 13.8 |
| % Elongation@Break | 313 | 270 | 270 | 340 | 290 | 310 | 400 | 420 |
| 3 days aged at 100° C. stress-strain properties | | | | | | | | |
| modulus 50% (MPa) | 2.63 | 2.77 | 2.85 | 2.63 | 2.33 | 2.35 | 2.96 | 2.35 |
| modulus 100% (MPa) | 4.95 | 5.56 | 5.64 | 5.08 | 5.2 | 4.67 | 4.70 | 4.40 |
| tensile strength (MPa) | 12.80 | 9.32 | 9.05 | 8.35 | 9.97 | 9.54 | 9.33 | 11.7 |
| % Elongation@Break | 230 | 160 | 160 | 160 | 190 | 190 | 220 | 260 |
| % changes in physical properties from [aged/unaged ratio × 100] | | | | | | | | |
| modulus 50% (MPa) | 132 | 135 | 148 | 151 | 125 | 129 | 153 | 158 |
| modulus 100% (MPa) | 135 | 142 | 154 | 161 | 149 | 137 | 159 | 171 |
| tensile strength (MPa) | 91 | 75 | 83 | 65 | 87 | 73 | 80 | 85 |
| % Elongation@Break | 73 | 59 | 59 | 47 | 66 | 61 | 55 | 62 |

The elongation at break values can be used to evaluate the plasticization effect of a plasticizer.

Table 6 shows that all the compositions prepared with the esters (R-C to R-G) of the present invention are able to achieve and even exceed the elongation at break value observed with the composition comprising T-DAE oil (R-A) and to exceed in all cases the elongation measured on the composition comprising MES oil (R-B). Thus, even at high loading of 37 PHR the esters (R-C to R-G) prepared from renewable sources are able to replace completely and without any compromise the traditional petroleum-based plasticizers T-DAE and MES and surpass the performances of the reference composition from renewable source R-H comprising sunflower oil.

Ageing is another key parameter to evaluate the plasticizer effect on the long term properties of a rubber composition. Table 6 in the middle part, shows the data obtained on rubber compositions aged 3 days at 100° C. At the bottom of Table 6 are reported the percentages of change in physical properties after ageing. The values are obtained from the ratio (aged property/unaged property)×100. In this type of tire tread composition, ageing causes an increase in the moduli values and a reduction of the tensile strength and elongation properties. The aged data in Table 6 show very clearly that the new rubber compositions of the present The comments reported on moduli and tensile/elongation after Table 6 on the rubber compounds of Table 4 are fully confirmed in the case of the rubber compounds of formulations of Table 4 bis with the stress-strain properties reported in Table 6 bis. The dimer/trimer lauryl esters (R'-E, R'-I, R'-J and R'-K) are characterized by higher moduli that the reference compound R'-H with sunflower oil. Furthermore, the dimer/trimer lauryl esters show all the physical properties pretty aligned with those of the petroleum-based reference plasticizers R'-A and moreover R'-B.

Dynamic (Viscoelastic) Properties

For tire tread application it is necessary also to evaluate the dynamic properties of the rubber compositions. With "dynamic properties" it is intended the viscoelastic properties of a rubber composition. Such viscoelastic properties can be measured with a mechanical spectrometer or a dynamic mechanical analyzer (DMA) as reported for example in open literature reference [Cataldo, F., et al. (2013) *ISRN Polymer Science*, Article ID 340426, 9 pages]. A typical evaluation of the dynamic properties of rubber tread composition was performed on DMA using a temperature sweep from −100° C. to +100° C. (at 2° C./min), a frequency of 10 Hz and a strain amplitude of 0.1%. The dais are summarized in Tables 7 and 7bis.

TABLE 7

Dynamic properties of the rubber tread compositions as measured on the dynamic mechanical analyzer
in temperature sweep (from −100° C. to +100° C. at 2° C./min, frequency of 10 Hz, amplitude 0.1%)

| | R-A | R-B | R-C | R-D | R-E | R-F | R-G | R-H |
|---|---|---|---|---|---|---|---|---|
| temperature −20° C. | | | | | | | | |
| E' (MPa) | 171.38 | 93.73 | 149.42 | 121.94 | 216.03 | 507.78 | 190.75 | 135.05 |
| E" (MPa) | 46.34 | 28.33 | 29.30 | 24.59 | 46.56 | 93.01 | 50.95 | 23.05 |
| tanδ (−20° C.) | 0.270 | 0.302 | 0.196 | 0.202 | 0.216 | 0.183 | 0.267 | 0.171 |
| temperature 0° C. | | | | | | | | |
| E' (MPa) | 101.15 | 58.14 | 97.75 | 78.48 | 90.76 | 275.51 | 104.7 | 90.48 |
| E" (MPa) | 16.23 | 8.54 | 14.06 | 11.31 | 14.08 | 37.83 | 16.95 | 11.67 |
| tanδ (0° C.) | 0.160 | 0.147 | 0.144 | 0.144 | 0.155 | 0.137 | 0.162 | 0.129 |
| temperature +30° C. | | | | | | | | |
| E' (MPa) | 68.48 | 35.53 | 64.63 | 51.91 | 50.89 | 59.43 | 61.27 | 62.36 |
| E" (MPa) | 6.84 | 3.78 | 7.32 | 5.79 | 5.84 | 8.29 | 8.09 | 6.51 |
| tanδ (+30° C.) | 0.100 | 0.106 | 0.113 | 0.112 | 0.115 | 0.139 | 0.132 | 0.104 |
| temperature +60° C. | | | | | | | | |
| E' (MPa) | 43.38 | 26.89 | 48.41 | 39.36 | 38.32 | 38.38 | 42.06 | 45.67 |
| E" (MPa) | 4.05 | 2.32 | 4.47 | 3.36 | 3.47 | 3.85 | 4.43 | 4.33 |
| tanδ (+60° C.) | 0.093 | 0.086 | 0.092 | 0.085 | 0.091 | 0.100 | 0.105 | 0.095 |
| Tg from E' curve (° C.) | −80 | −76 | −66 | −75 | −60 | −59 | −73 | −77 |
| E" peak (° C.) | −59 | −59 | −51 | −53 | −49 | −47 | −57 | −57 |
| tanδ peak (° C.) | −43 | −39 | −37 | −37 | −31 | −28 | −39 | −43 |
| tanδ peak (value) | 0.39 | 0.50 | 0.38 | 0.38 | 0.28 | 0.23 | 0.37 | 0.38 |

TABLE 7bis

Dynamic properties of the rubber tread compositions as measured on the dynamic mechanical analyzer in
temperature sweep (from −100° C. to +100° C. at 2° C. /min, frequency of 10 Hz, amplitude 0.1%)

| | R'-A | R'-B | R'-E | R'-I | R'-J | R'-K | R'-L | R'-H |
|---|---|---|---|---|---|---|---|---|
| temperature 0° C. | | | | | | | | |
| E' (MPa) | 49.14 | 46.79 | 44.46 | 42.75 | 43.3 | 40.4 | 97.00 | 34.22 |
| E" (MPa) | 8.60 | 7.36 | 7.28 | 7.33 | 6.98 | 6.8 | 20.98 | 5.25 |
| tan δ (0° C.) | 0.175 | 0.157 | 0.164 | 0.171 | 0.161 | 0.168 | 0.216 | 0.153 |
| temperature +30° C. | | | | | | | | |
| E' (MPa) | 28.27 | 28.98 | 25.88 | 23.58 | 24.98 | 22.59 | 35.75 | 22.28 |
| E" (MPa) | 3.57 | 3.36 | 3.18 | 3.06 | 3.08 | 2.73 | 7.46 | 2.71 |
| tan δ (+30° C.) | 0.126 | 0.116 | 0.123 | 0.130 | 0.123 | 0.121 | 0.209 | 0.122 |
| temperature +60° C. | | | | | | | | |
| E' (MPa) | 19.63 | 20.95 | 18.7 | 16.94 | 18.00 | 15.85 | 19.97 | 16.11 |
| E" (MPa) | 1.96 | 1.90 | 1.78 | 1.68 | 1.72 | 1.48 | 2.84 | 1.61 |
| tan δ (+60° C.) | 0.100 | 0.091 | 0.095 | 0.099 | 0.096 | 0.093 | 0.142 | 0.100 |

From the DMA curve from −100° C. to +100° C. can be extracted the elastic modulus (E'), the loss modulus (E") and the tan δ (ratio E"/E'), recorded at −20° C. to evaluate and predict the winter performances of the tire tread composition. The parameters at 0° C. are used to evaluate and predict the wet traction performances. The parameters at +30° C. are used to evaluate and predict the dry traction performances. The parameters at 60° C. are necessary for the evaluation and prediction of the rolling resistance performances of the tire tread compositions. The elastic modulus at −20° C. is used to evaluate the winter performances and the mechanical hysteresis (i.e. tan δ) at 0° C., at +30° C. and at +60° C. to evaluate the wet traction, dry traction and rolling resistance respectively.

Figure 6:
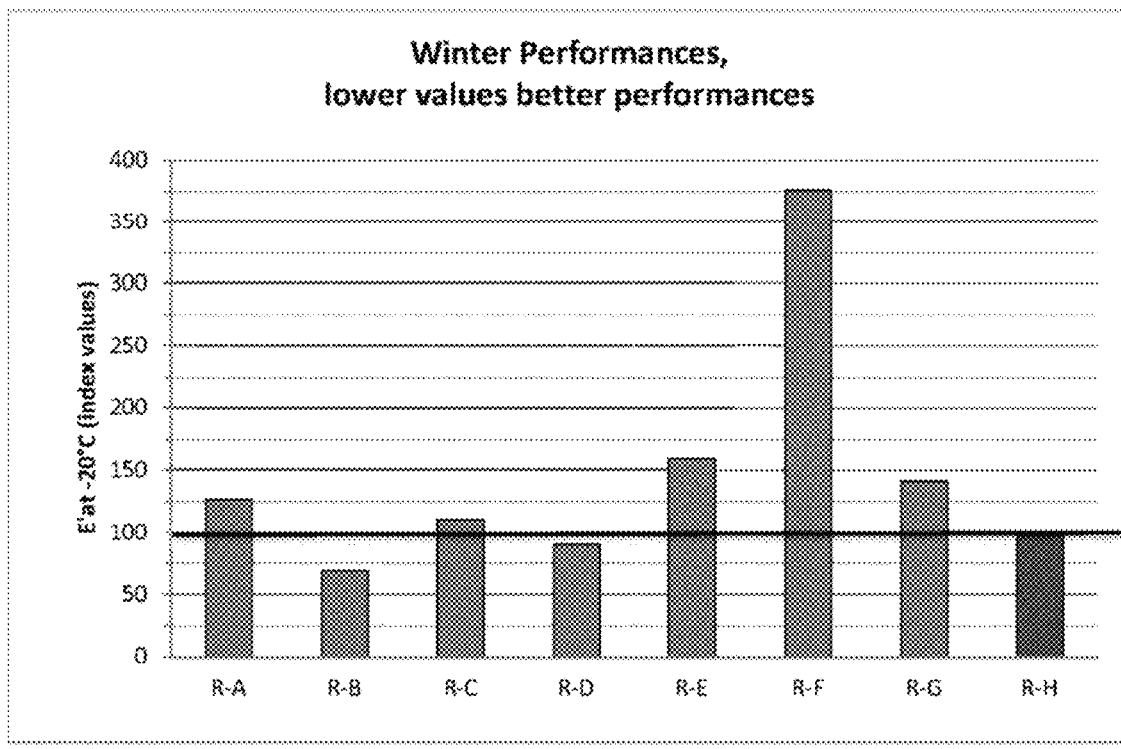
FIG. 6 represents the winter performances of tire tread compositions R-A to R-H evaluated on the basis of the elastic modulus (E') measured at −20° C. The values are reported as index values making 100 the E' or the reference composition with sunflower oil. Lower index values imply better winter performances.

FIG. 6 shows the elastic moduli E' at −20° C. (which correlate with the tread winter performances) taken from Table 7 and reported as index values, fixing to 100 the E' value measured on the reference rubber composition R-H prepared with sunflower oil. From FIG. 6 it appears that the rubber compositions R-C, R-D, R-E and R-G show winter performances comparable to the rubber composition with T-DAE and to the reference rubber composition with sunflower oil.

Figure 7:
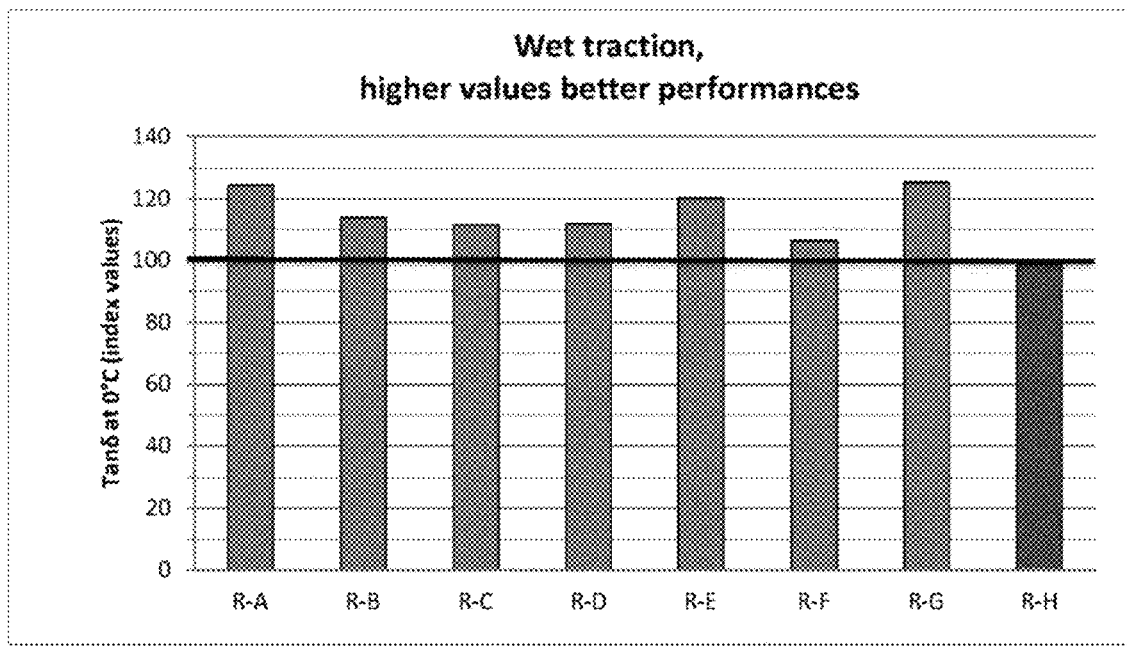
FIG. 7 represents the wet traction performances of tire tread compositions R-A to R-H evaluated on the basis of the mechanical hysteresis (tan δ) measured at 0° C. The values are reported as index values fixing to 100 the tan δ of the reference composition with sunflower oil. Higher index values imply better wet traction.

FIG. 7 summarizes the tan δ values at 0° C. (which correlate with the tread wet traction) taken from Table 7 and reported as index values, fixing to 100 the tan δ value measured on the reference rubber composition R-H prepared with sunflower oil. The wet traction data do not show very much difference among the tested compositions. FIG. 7 shows that the rubber composition R-E and R-G prepared with the Pripol 1040 lauryl and THFA esters are exceeding the wet traction performances of the reference rubber composition with sunflower oil.

Figure 10:
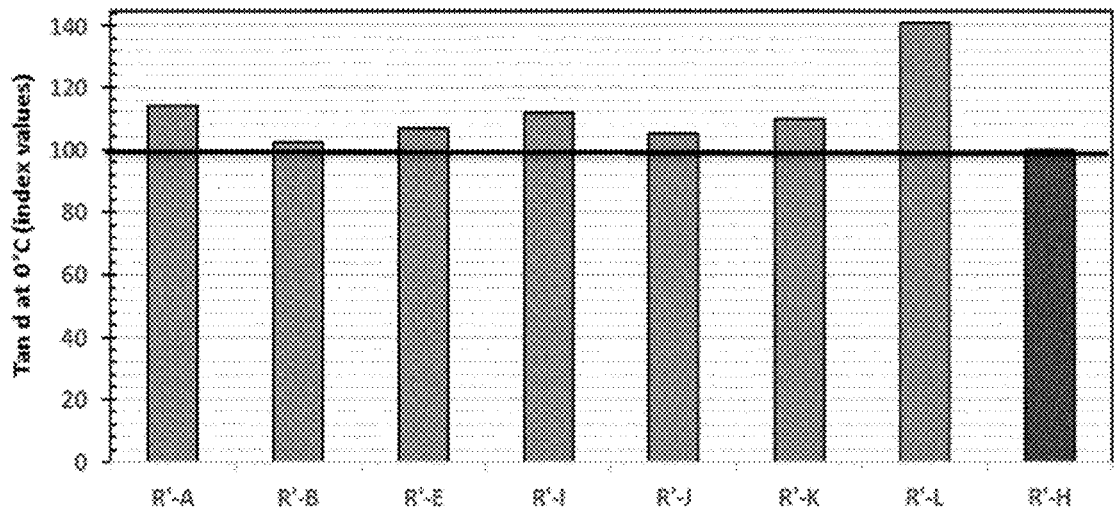
FIG. 10 represents the wet traction performances of tire tread compositions R'-A to R'-H evaluated on the basis or the mechanical hysteresis (tan δ) measured at 0° C. The values are reported as index values fixing to 100 the tan δ of the reference composition with sunflower oil. Higher index values imply better wet traction.

FIG. 10 summarizes the tan δ values at 0° C. (which correlate with the tread wet traction) taken from Table 7bis and reported as index values, fixing to 100 the tan δ value measured on the reference rubber composition R'-H prepared with sunflower oil. FIG. 10 shows that the rubber composition R'-E, R'-I, R'-J, R'-K and R'-L prepared with the dimer/trimer esters and acids defined in the invention are exceeding the wet traction performances of the reference rubber composition with sunflower oil. It can be noted that the acid containing rubber composition R'-L provides a much improved wet traction performance than the reference or rubber composition with T-DAE or MES.

Figure 8:
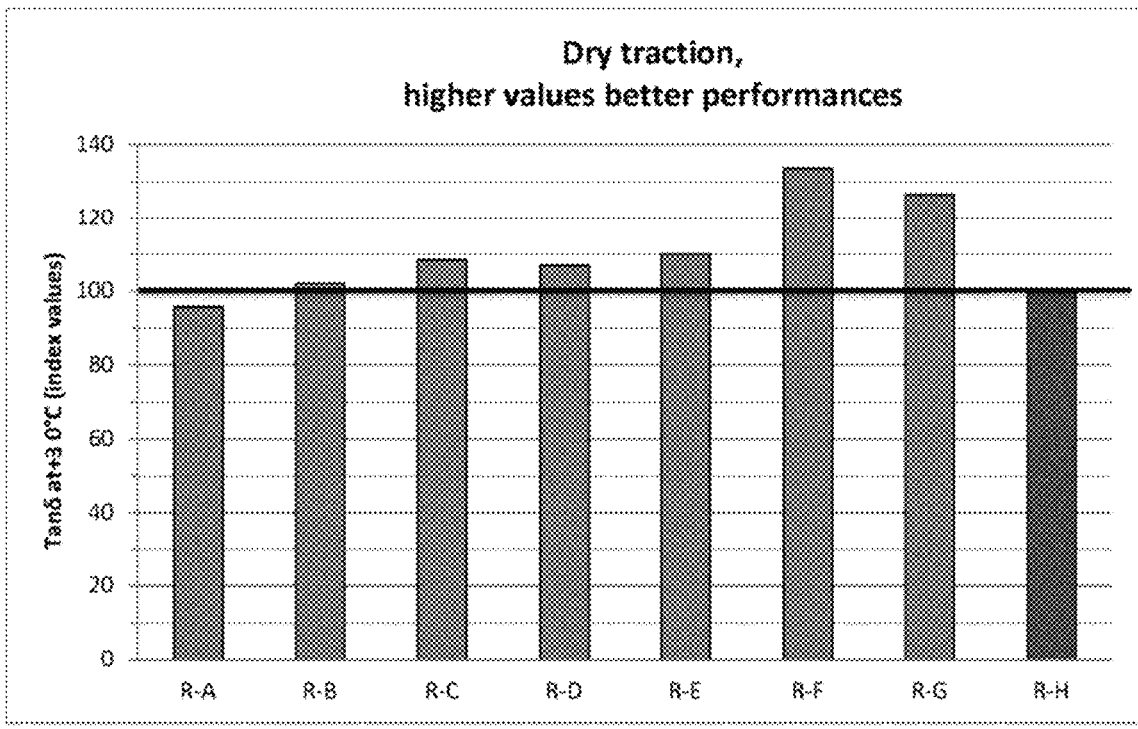
FIG. 8 represents the dry traction performances of tire tread compositions R-A to R-H evaluated on the basis of the mechanical hysteresis (tan δ) measured at +30° C. The values are reported as index values fixing to 100 the tan δ of the reference composition with sunflower oil. Higher index values imply better dry traction.

FIG. 8 shows the tan δ values at +30° C. (which correlate with the tread dry traction) taken from Table 7 and reported as index values, fixing to 100 the tan δ value measured on the reference rubber composition R-H prepared with sunflower oil. On this tire tread performance, all the esters considered give better dry traction properties than the reference composition with sunflower oil. Furthermore, while the rubber compositions comprising Pripol-1040 ethyl, nonyl and lauryl esters are 10% better in dry traction than the rubber composition with T-DAE, rubber compositions with Pripol-1040 stearyl and THFA ester are 20% better in dry traction than the rubber composition with T-DAE.

Figure 11:
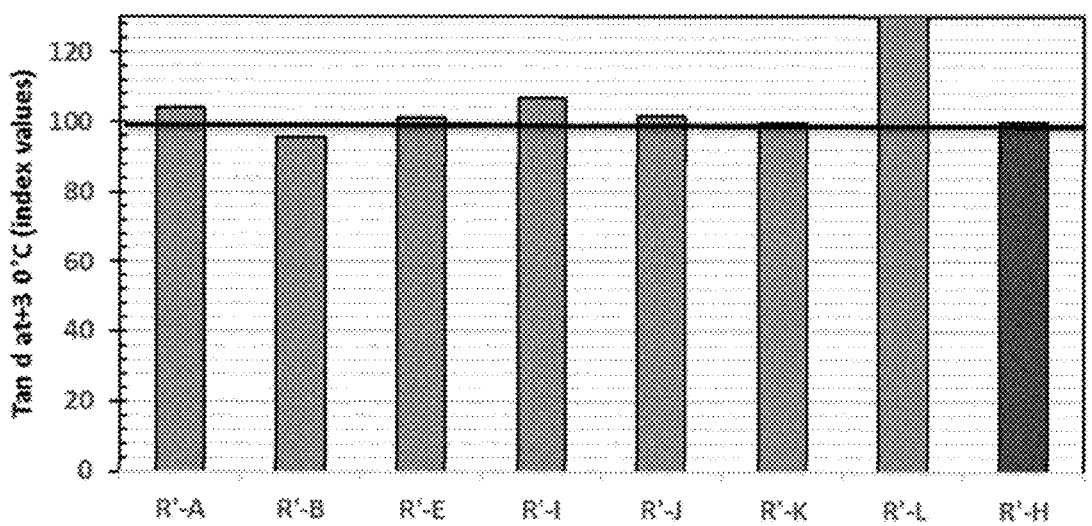
FIG. 11 represents the dry traction performances of tire tread compositions R'-A to R'-H evaluated on the basis of the mechanical hysteresis (tan δ) measured at +30° C. The values are reported as index values fixing to 100 the tan δ of the reference composition with sunflower oil. Higher index values imply better dry traction.

FIG. 11 shows the tan δ values at +30° C. (which correlate with the tread dry traction) taken from Table 7bis and reported as index values, fixing to 100 the tan δ value measured on the reference rubber composition R'-H prepared with sunflower oil. On this tire tread performance, all the esters or acids of the invention give the same dry traction as or a better dry traction than the reference composition with sunflower oil. It can be noted that the acid containing rubber composition R'-L provides a much improved dry traction performance than the reference or rubber composition with T-DAE or MES.

Figure 9:
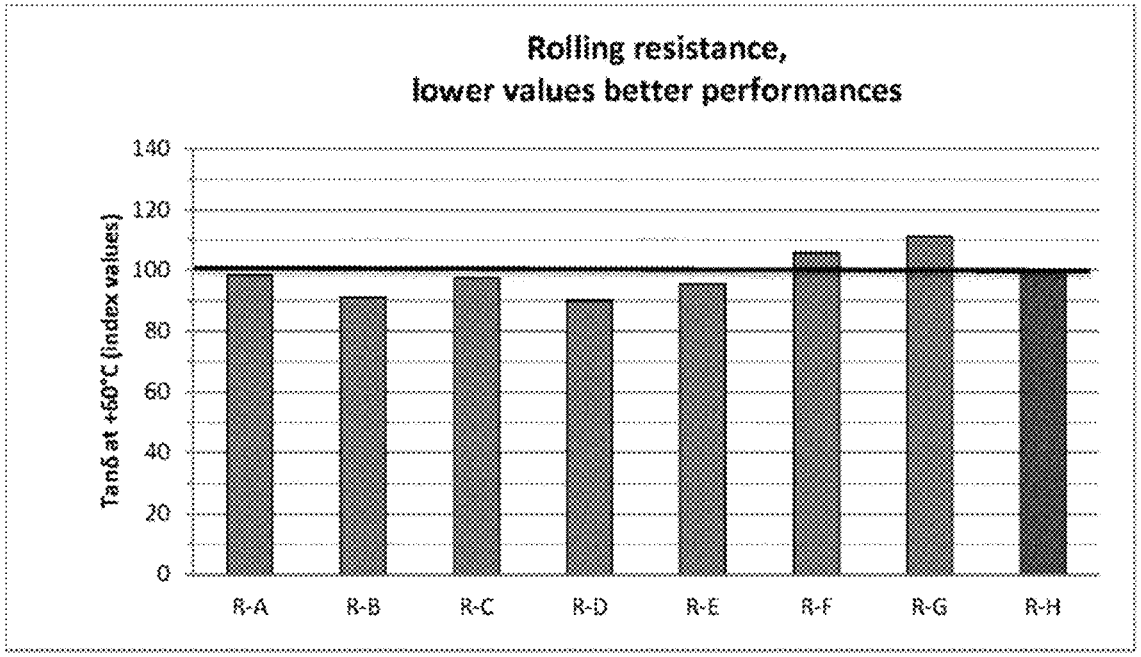
FIG. 9 represents the rolling resistance performances of tire tread compositions R-A to R-H evaluated on the basis of the mechanical hysteresis (tan δ) measured at +60° C. The values are reported as index values fixing to 100 the tan δ of the reference composition with sunflower oil. Lower index values imply better rolling resistance performance.

FIG. 9 summarizes the tan δ values at +60° C. (which correlate with the tread rolling resistance) taken from Table 7 and reported as index values, fixing to 100 the tan δ value measured on the reference rubber composition R-H prepared with sunflower oil. The rolling resistance parameter is a key tire tread parameter which correlates also with the contribution of the tire tread to the car fuel consumption. Thus, lower rolling resistance is desirable to meet the growing attention to reduce the fuel consumption. FIG. 9 shows that the rubber compositions plasticized with the Pripol-1040 esters and in particular those prepared with Pripol-1040 ethyl, nonyl and lauryl esters are giving lower rolling resistance than the reference composition with sunflower oil and also match or even exceeds the rolling resistance performances of the MES oil. The latter is known to the experts in the art to give lower rolling resistance than T-DAE oil but this lower rolling resistance level is still appropriate to the tire application.

Figure 12:
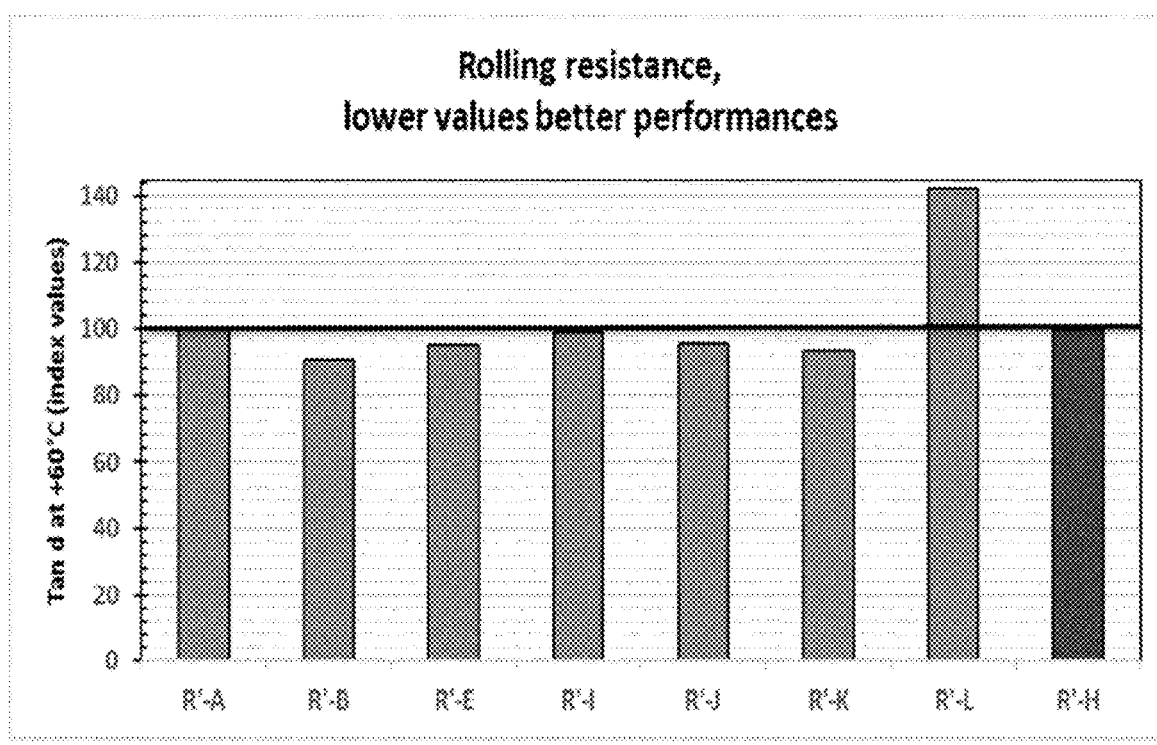
FIG. 12 represents the rolling resistance performances of tire tread compositions R'-A to R'-H evaluated on the basis of the mechanical hysteresis (tan δ) measured at +60° C. The values are reported as index values fixing to 100 the tan δ of the reference composition with sunflower oil. Lower index values imply better rolling resistance performance.

FIG. 12 summarizes the tan δ values at +60° C. (which correlate with the tread rolling resistance) taken from Table 7bis and reported as index values, fixing to 100 the tan δ value measured on the reference rubber composition R'-H prepared with sunflower oil. All the ester containing compositions of the invention R'-E, R'-I, R'-J and R'-K give a similar to better rolling resistance performance then the reference.

Table 8 below shows an overall summary of the dynamic properties in the rubber tire tread compositions reported in Table 4, based on the experimental data of Table 7 which were extracted and discussed as index values in FIG. 6-9.

The rubber composition plasticized with sunflower oil was taken as reference in Table 8 where the winter performances (WP), the wet traction (WT), dry traction (DT) and rolling resistance (RR) are reported in a simplified and easily comparable way.

TABLE 8

Summary of the dynamic properties of the rubber tread compositions

| | R-A T-DAE | R-B MES | R-C ethyl ester | R-D nonyl ester | R-E lauryl ester | R-F stearyl ester | R-G THFA ester | R-H sunflower oil |
|---|---|---|---|---|---|---|---|---|
| Winter performances (WP) | (−) | (+) | (=) | (=) | (−−) | (−−−) | (−) | Reference |
| Wet traction (WT) | (++) | (+) | (+) | (+) | (++) | (+) | (++) | Reference |
| Dry traction (DT) | (=) | (=) | (+) | (+) | (+) | (++) | (++) | Reference |
| Rolling resistance (RR) | (=) | (+) | (=) | (+) | (=) | (=) | (−) | Reference |

"(=)" means equal or very similar to reference
"(+)", "(++)", "(+++)" mean better or much better than reference
"(−)", "(−−)", "(−−−)" mean worse or much worse than reference From Table 8, it appears clearly that the rubber compositions R-C comprising Pripol-1040 ethyl ester and R-D comprising Pripol-1040 nonyl ester are comparable to the reference composition comprising sunflower oil (R-H) in winter performances. In terms of wet (WT) and dry traction (DT) the Pripol-1040 esters show definitely better performances than those displayed by the reference compound R-H loaded with sunflower oil. These better WT and DT performances are obtained at same rolling resistance (RR) results than the reference compound R-H. Thus, the improvements in WT and DT offered by the dimer/trimer esters are achieved with the simultaneous maintenance or the RR and keeping also the winter performances (WP) at least for the case of R-B and R-C. These results represent a definite merit over the performances offered by sunflower oil (R-H) used as reference plasticizer.

Pripol-1040 ethyl ester or nonyl ester could replace completely T-DAE oil in a rubber composition at the same loading, providing equal or better performances. Furthermore, Pripol-1040 lauryl ester gives equal to higher unaged moduli and higher unaged tensile strength than T-DAE confirming as the plasticizer of choice in place of T-DAE.

Furthermore, rubber composition R-G comprising Pripol-1040 THFA ester is much better than the reference composition comprising sunflower oil in Wet Traction and Dry Traction and hence could be used for these specific applications. Also, stearyl ester R-E is recommended in rubber compositions where a high level of WT is desired and rubber composition R-F is recommended in rubber compositions where a high level of DT is desired.

Table 8bis below shows an overall summary of the dynamic properties in the rubber tire tread compositions reported in Table 4bis, based on the experimental data of Table 7bis which were extracted and discussed as index values in FIGS. 10-12.

TABLE 8bis

Summary of the dynamic properties of the rubber tread compositions

|  | R'-A T-DAE | R'-B MES | R'-E Pripol 1040 Lauryl ester | R'-I Pripol 1045 Lauryl ester | R'-J Pripol 1017 lauryl ester | R'-K Pripol 1025 lauryl ester | R'-L Pripol 1045 | R'-H sunflower oil |
|---|---|---|---|---|---|---|---|---|
| Wet traction (WT) | (+++) | (=) | (+) | (+++) | (+) | (++) | (+++) | Reference |
| Dry traction (DT) | (+) | (−) | (=) | (++) | (=) | (=) | (+++) | Reference |
| Rolling resistance (RR) | (=) | (++) | (+) | (=) | (+) | (++) | (−−−) | Reference |

"(=)" means equal or very similar to reference
"(+)", "(++)", "(+++)" mean better or much better than reference
"(−)", "(−−)", "(−−−)" mean worse or much worse than reference From Table 8bis, it appears clearly that rubber compositions of the invention provide improved wet traction and dry traction performances as compared with the reference or with the composition containing sunflower oil (R'H), confirming the results already observed in the case of Table 8. Composition R'-K provides an improved rolling resistance as compared with the reference or the composition comprising T-DAE.

The drawbacks evidenced in vegetable oils used as rubber composition plasticizers such as sunflower oil can be enumerated as follows: undesirable faster curing against T-DAE and all Pripol-1040 esters with alcohols from renewable sources; lower moduli than reference T-DAE and all Pripol-1040 esters. Reference sunflower oil suffers also of low traction properties (both wet and dry) and is overcome in such performance by the dimer/trimer esters object of the present inventions. The high traction performances of the dimer/trimer esters of the present invention are achieved with simultaneous improvements in rolling resistance. Thus, also in this latter parameter the reference sunflower oil is overcome by the performances of the dimer/trimer esters of the present invention.

The invention claimed is:

1. Rubber composition for tire applications comprising:
   rubber polymers comprising at least optionally functionalized styrene-butadiene rubber (SBR) and at least one rubber selected from polybutadiene rubber (BR), natural rubber (NR), polyisoprene rubber (IR) and mixtures thereof, and
   at least one ester derived from renewable sources resulting from the esterification of trimer and/or dimer acids having the formula A-$(COOH)_q$, with q being 2 or 3 and A being identical or different, acyclic, cyclic or polycyclic, saturated or unsaturated, linear or branched hydrocarbon groups having from 3 to 69 carbon atoms, with acyclic or cyclic, saturated or unsaturated, linear or branched alcohols,
   said rubber polymers comprising:
   from 20 to 90% by weight of styrene-butadiene rubber(s) optionally functionalized and
   from 10 to 80% by weight of at least one rubber selected from polybutadiene rubber (BR), natural rubber (NR), polyisoprene rubber (IR) and mixtures thereof,
   based on the total weight of the rubber polymers,
   wherein the rubber composition comprises from 5 to 80 PHR of the ester derived from renewable sources.

2. Rubber composition according to claim 1, wherein the at least one ester derived from renewable sources comprise from 50 to 100 wt %, based on the total weight of the at least one ester, of at least one trimer ester resulting from the esterification of trimer acids having the formula A-$(COOH)_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols.

3. Rubber composition according to claim 1, wherein the at least one ester derived from renewable sources comprises:
   at least one trimer ester, said trimer ester(s) resulting from the esterification of trimer acids having the formula A-$(COOH)_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols; and
   at least one dimer ester, said dimer ester(s) resulting from the esterification of dimer acid(s) dimer acids having the formula A-$(COOH)_2$, with A being identical or different, acyclic, cyclic or polycyclic, saturated or unsaturated, linear or branched hydrocarbon groups having from 3 to 46 carbon atoms, with acyclic or cyclic, saturated or unsaturated, linear or branched alcohols.

4. Rubber composition according to claim 1, wherein the trimer and/or dimer acids result from one or more addition reactions of unsaturated fatty acids.

5. Rubber composition according to claim 4, wherein the unsaturated fatty acids have from 4 to 24 carbon atoms (C4 to C24).

6. Rubber composition according to claim 4, wherein the unsaturated fatty acids have 18 carbon atoms (C18).

7. Rubber composition according to claim 4, wherein the unsaturated fatty acids are chosen from oleic acid, linoleic acid, linolenic acid, and mixtures thereof.

8. Rubber composition according to claim 4, wherein the unsaturated fatty acids are obtained from Tall Oil Fatty Acid.

9. Rubber composition according to claim 1, wherein the acyclic or cyclic, saturated or unsaturated, linear or branched alcohols are chosen from ethanol, 1-nonanol, lauryl alcohol, stearyl alcohol, tetrahydrofurfuryl alcohol, and mixtures thereof.

10. Rubber composition according to claim 1, further comprising:
    from 5 to 50 PHR of carbon black, and
    from 10 to 90 PHR of silica.

11. Tire tread comprising the rubber composition according to claim 1.

12. Tire comprising a tire tread according to claim 11.

13. Rubber composition according to claim 2, wherein the at least one ester derived from renewable sources comprise from 60 to 100% wt, based on the total weight of the at least one ester, of at least one trimer ester resulting from the esterification of trimer acids having the formula A-(COOH)$_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols.

14. Rubber composition according to claim 3 wherein:
    the at least one trimer ester is present in an amount, based on the total weight of the ester(s) derived from renewable sources, of from 50 to 99% wt; and
    the at least one dimer ester is present in an amount, based on the total weight of the ester(s) derived from renewable sources, of from 1 to 50 wt %.

15. Rubber composition according to claim 10, wherein the carbon black is selected from grade N375, grade N220, grade N234 or grade N134 carbon black or mixtures thereof.

16. Rubber composition for tire applications comprising:
    rubber polymers comprising at least optionally functionalized styrene-butadiene rubber (SBR) and at least one rubber selected from polybutadiene rubber (BR), natural rubber (NR), polyisoprene rubber (IR) and mixtures thereof, and
    at least one ester derived from renewable sources resulting from the esterification of trimer and/or dimer acids having the formula A-(COOH)$_q$, with q being 2 or 3 and A being identical or different, acyclic, cyclic or polycyclic, saturated or unsaturated, linear or branched hydrocarbon groups having from 3 to 69 carbon atoms, with acyclic or cyclic, saturated or unsaturated, linear or branched alcohols,
    said rubber polymers comprising:
    from 20 to 90% by weight of styrene-butadiene rubber(s) optionally functionalized and
    from 10 to 80% by weight of at least one rubber selected from polybutadiene rubber (BR), natural rubber (NR), polyisoprene rubber (IR) and mixtures thereof,
    based on the total weight of the rubber polymers,
    wherein the at least one ester derived from renewable sources comprise from 50 to 100 wt %, based on the total weight of the at least one ester, of at least one trimer ester resulting from the esterification of trimer acids having the formula A-(COOH)$_3$, with A being identical or different, acyclic, cyclic or polycyclic, saturated or unsaturated, linear or branched hydrocarbon group having from 3 to 69 carbon atoms, with acyclic or cyclic, saturated or unsaturated, linear or branched alcohols.

17. Process to plasticize a rubber composition comprising from 20 to 90% wt of optionally functionalized styrene-butadiene rubber(s) (SBR) and from 10 to 80% of at least one rubber selected from polybutadiene rubber (BR), natural rubber (NR), polyisoprene rubber (IR) and mixtures thereof, based on the total weight of the rubber composition, the process comprising adding into the rubber composition:
    an ester derived from renewable sources comprising from 50 to 100 wt % of at least one trimer ester resulting from the esterification of trimer acids having the formula A-(COOH)$_3$, with A being an acyclic, cyclic or polycyclic, saturated or unsaturated, linear or branched hydrocarbon group having from 3 to 69 carbon atoms, with acyclic or cyclic, saturated or unsaturated, linear or branched alcohols,
    wherein the rubber composition comprises from 5 to 80 PHR of the ester derived from renewable sources.

18. Process according to claim 17, comprising a step of improving the viscoelastic properties of the rubber composition.

19. Process according to claim 17, wherein the ester is added into the rubber composition.

* * * * *